United States Patent
Takaki et al.

(10) Patent No.: US 11,359,553 B2
(45) Date of Patent: Jun. 14, 2022

(54) CONTROL DEVICE FOR GAS TURBINE, GAS TURBINE, AND GAS TURBINE CONTROLLING METHOD

(71) Applicant: Mitsubishi Hitachi Power Systems, Ltd., Yokohama (JP)

(72) Inventors: Kazushige Takaki, Tokyo (JP); Akihiko Saito, Tokyo (JP); Ryuji Takenaka, Yokohama (JP); Yoshifumi Iwasaki, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 161 days.

(21) Appl. No.: 16/962,644

(22) PCT Filed: Apr. 9, 2019

(86) PCT No.: PCT/JP2019/015527
§ 371 (c)(1),
(2) Date: Jul. 16, 2020

(87) PCT Pub. No.: WO2019/198730
PCT Pub. Date: Oct. 17, 2019

(65) Prior Publication Data
US 2020/0340410 A1    Oct. 29, 2020

(30) Foreign Application Priority Data
Apr. 13, 2018   (JP) .............................. JP2018-077254

(51) Int. Cl.
*F02C 9/00* (2006.01)
*F02C 9/28* (2006.01)
*F02C 9/32* (2006.01)

(52) U.S. Cl.
CPC .................. *F02C 9/28* (2013.01); *F02C 9/32* (2013.01); *F05D 2270/05* (2013.01); *F05D 2270/44* (2013.01); *F05D 2270/706* (2013.01)

(58) Field of Classification Search
CPC ...................................... F02C 9/28; F02C 9/32
See application file for complete search history.

(56) References Cited

U.S. PATENT DOCUMENTS

| | | | |
|---|---|---|---|
| 2004/0159105 A1* | 8/2004 | Tanaka | F01D 15/10 60/773 |
| 2007/0169463 A1 | 7/2007 | Tanaka et al. | |

FOREIGN PATENT DOCUMENTS

| | | |
|---|---|---|
| JP | 2003-239764 | 8/2003 |
| JP | 2004-116384 | 4/2004 |
| JP | 2007-177626 | 7/2007 |

OTHER PUBLICATIONS

International Search Report dated Jun. 11, 2019 in International (PCT) Application No. PCT/JP2019/015527.

* cited by examiner

Primary Examiner — Katheryn A Malatek
(74) Attorney, Agent, or Firm — Wenderoth, Lind & Ponack, L.L.P.

(57) ABSTRACT

A control device for a gas turbine include: a target value calculation part configured to calculate a control target value being a target value of an output of the gas turbine; and a command value calculation part configured to calculate a fuel command value on the basis of a deviation between the control target value and an actual output value of the gas turbine. The target value calculation part is configured to: set the control target value to a value which is greater than an output demand value of the gas turbine immediately before a difference between the output demand value and the actual output (Continued)

value becomes not greater than a threshold; and subtract the control target value from the value after the difference becomes not greater than the threshold.

20 Claims, 12 Drawing Sheets

CONTROL DEVICE FOR GAS TURBINE, GAS TURBINE, AND GAS TURBINE CONTROLLING METHOD

TECHNICAL FIELD

The present disclosure relates to a control device for a gas turbine, a gas turbine, and a gas turbine controlling method.

BACKGROUND ART

It may be necessary to control operation of a gas turbine so as to change the output in accordance with fluctuation of the demand load.

As a device for performing such an operation control, for instance, Patent Document 1 discloses a control device that controls the load of a gas turbine through a feedback control based on the deviation of the actual output of a generator from a target output calculated from a load demand setting value.

The control device is configured such that the target output of the feedback control is determined on the basis of a load setting value (LDSET) obtained in accordance with the load demand setting value. More specifically, for instance, when the load demand setting value increases in a step pattern, the load setting value (LDSET) increases gradually from a pre-change load demand setting value to a post-change load demand setting value.

Furthermore, the control device is configured such that the feedback control is performed on the basis of the target output obtained by adding a predetermined bias value to the load setting value (LDSET) while the load setting value (LDSET) is gradually increasing as described above, so that the generator output is able to respond to the change in the demand load setting value quickly.

CITATION LIST

Patent Literature

Patent Document 1: JP2007-177626A

SUMMARY

Problems to be Solved

Meanwhile, it may be necessary to increase the output of the gas turbine rapidly when starting the plant, for instance.

To increase the output of the gas turbine rapidly, the flow rate of the fuel supplied to the combustor needs to be increased rapidly. However, in the case, the fuel in the combustor tends to be excessive with respect to air, and thus the turbine inlet temperature is likely to increase. If the turbine inlet temperature exceeds the design upper limit value, it may cause damage to devices that constitute the gas turbine. Thus, it is desirable to suppress excess of the turbine inlet temperature while enabling a rapid output increase of the gas turbine.

In view of the above, an object of at least one embodiment of the present invention is to provide a control device for a gas turbine, a gas turbine, and a gas turbine control method capable of increasing the output of the gas turbine rapidly and preventing excess of the turbine inlet temperature.

Solution to the Problems (1) According to at least one embodiment of the present invention, a control device for a gas turbine includes: a target value calculation part configured to calculate a control target value being a target value of an output of the gas turbine; and a command value calculation part configured to calculate a fuel command value on the basis of a deviation between the control target value and an actual output value of the gas turbine. The target value calculation part is configured to: immediately before a difference between the output demand value and the actual output value becomes not greater than a threshold, set the control target value to a value which is greater than an output demand value of the gas turbine; and decrease the control target value from the value after the difference becomes not greater than the threshold.

With the above configuration (1), immediately before the difference between the actual output value and the output demand value becomes not greater than the threshold, a control is performed on the basis of the control target value set as a value larger than the output demand value. Thus, it is possible to ensure a large control deviation until the actual output value further approaches the output demand value (that is, until the difference between the output demand value and the actual output value reaches the threshold), even after the control target value reaches the output demand value. Accordingly, it is possible to improve the control responsiveness.

Furthermore, in the above configuration (1), the control target value is decreased after the difference between the output demand value and the actual output value becomes not greater than the threshold. Thus, it is possible to calculate the fuel command value so as to suppress overshoot, and suppress excess of the flow rate of the fuel to be supplied to the gas turbine.

Thus, with the above configuration (1), it is possible to prevent excess of the turbine inlet temperature while enabling a rapid output increase of the gas turbine.

(2) In some embodiments, in the above configuration (1), the target value calculation part is configured to: if a bias adding condition including that the difference is greater than the threshold is satisfied, calculate the control target value to be not greater than a sum of the output demand value and a bias value; and calculate the control target value to be a value smaller than the sum of the output demand value and the bias value if the bias adding condition is not satisfied.

With the above configuration (2), when the difference between the actual output value and the output demand value is greater than the threshold (that is, until immediately before the difference reaches the threshold), a control is performed on the basis of the control target value obtained by adding the bias value to the output demand value. Thus, it is possible to ensure a large control deviation until the actual output value further approaches the output demand value (that is, until the difference between the output demand value and the actual output value reaches the threshold), even after the control target value reaches the output demand value. Accordingly, it is possible to improve the control responsiveness.

Furthermore, in the above configuration (2), the control target value is decreased to decrease the control deviation when the difference between the output demand value and the actual output value becomes not greater than the threshold by canceling the addition of the bias value in calculation of the control target value. Thus, it is possible to calculate the fuel command value so as to suppress overshoot, and suppress excess of the flow rate of fuel to be supplied to the gas turbine.

Thus, with the above configuration (2), it is possible to prevent excess of the turbine inlet temperature while enabling a rapid output increase of the gas turbine.

(3) In some embodiments, in the above configuration (2), the target value calculation part is configured to: if the bias adding condition is satisfied, increase the control target value toward the sum of the output demand value and the bias value at a constant rate; and if the bias adding condition is not satisfied, decrease the control target value at a constant rate until the control target value reaches the output demand value.

With the above configuration (3), the control target value is increased or decreased at a constant rate. Thus, compared to a case where the control target value is increased or decreased in a step pattern, for instance, it is possible to suppress a rapid change of the gas turbine output, and suppress damage to the gas turbine.

(4) In some embodiments, in the above configuration (2) or (3), the bias adding condition includes: a first condition that the difference is greater than the threshold; and at least one of: a second condition that an index of a turbine inlet temperature of the gas turbine is less than a threshold of the index; a third condition that an opening degree of an inlet guide vane of a compressor of the gas turbine is less than a full opening degree; or a fourth condition that an opening degree of a flow-rate regulating valve for regulating a fuel flow rate of the gas turbine is less than an upper limit value.

With the above configuration (4), if at least one of the first condition or at least one of the second to fourth conditions is satisfied, a control is performed on the basis of the control target value obtained by adding the bias value to the output demand value.

That is, if the difference between the output demand value and the actual output value is greater than the threshold, or if the turbine inlet temperature is lower than the threshold (e.g. upper limit value), or if the opening degree of the inlet guide vane is less than the full opening degree, or if the opening degree of the flow-rate regulation valve is less than an upper limit value, a control is performed on the basis of the control target value obtained by adding the bias value to the output demand value, and thus it is possible to ensure a large control deviation and improve the control responsiveness.

Furthermore, if the difference between the output demand value and the actual output value is not greater than the threshold, or if the turbine inlet temperature reaches the threshold (e.g. upper limit value) or if the opening degree of the inlet guide vane reaches the full opening degree, or if the opening degree of the flow-rate regulation valve reaches the upper limit value, addition of the bias value for calculating the control target value is canceled, to reduce the control target value and reduce the control deviation. Thus, it is possible to calculate the fuel command value so as to suppress overshoot, and suppress excess of the flow rate of fuel to be supplied to the gas turbine more reliably.

Thus, with the above configuration (4), it is possible to prevent excess of the turbine inlet temperature more reliably while enabling a rapid output increase of the gas turbine.

(5) In some embodiments, in any one of the above configurations (2) to (4), the bias value is a constant value while the bias adding condition is satisfied.

With the above configuration (5), the bias value is constant while the bias adding condition is satisfied, and thus it is possible to manage the bias value easily.

(6) In some embodiments, in any one of the above configurations (2) to (4), during a period in which the bias adding condition is satisfied, the bias value is zero when the control target value is smaller than the output demand value, and the bias value is a positive value when the control target value is not smaller than the output demand value.

With the above configuration (6), during the period in which the bias adding condition is satisfied, the bias value is added to the output demand value only in a period when the difference between the output demand value and the actual output value is relatively small and the necessity to add the bias value to increase the control deviation is high. Thus, it is possible to suppress excess of the fuel command value calculated by the command value calculation part more reliably in the foregoing period. Thus, it is possible to suppress excess of the flow rate of fuel to be supplied to the gas turbine more reliably.

(7) In some embodiments, in any one of the above configurations (2) to (4), the bias value is set to increase gradually with time while the bias adding condition is satisfied.

With the above configuration (7), by gradually increasing the bias value to be added to the output demand value while the bias adding condition is satisfied, it is possible to suppress a rapid increase of the fuel command value calculated by the command value calculation part. Thus, it is possible to suppress excess of the flow rate of fuel to be supplied to the gas turbine more reliably.

(8) In some embodiments, in any one of the above configurations (1) to (7), the command value calculation part includes: a feedback controller configured to receive an input signal based on the deviation and calculate a feedback command value for calculating the fuel command value; and a first upper-limit setting part configured to, if the difference between the output demand value and the actual output value becomes not greater than the threshold, limit the fuel command value to be not greater than an upper command limit value being the feedback command value at the time when the difference reaches the threshold.

With the above configuration (8), when the difference between the output demand value and the actual output value is not greater than the threshold, the fuel command value is limited to be not greater than the upper limit command value, which is the feedback command value at the time when the difference reaches the threshold. Thus, it is possible to suppress excess of the turbine inlet temperature more reliably.

(9) In some embodiments, in the above configuration (8), the feedback controller is configured to: calculate the feedback command value on the basis of a proportional term and an integral term obtained from the deviation; and if the difference becomes not greater than the threshold, limit an increase of the integral term and calculate the feedback command value.

With the above configuration (9), when the difference between the output demand value and the actual output value is not greater than the threshold, the fuel command value is limited to be not greater than the upper limit command value, which is the feedback command value at the time when the difference reaches the threshold, and the feedback command value is calculated while limiting an increase of the integral term. Thus, it is possible to prevent a phenomenon where the integral calculation saturates and the control responsiveness deteriorates (wind up).

(10) In some embodiments, in any one of the above configurations (1) to (7), the command value calculation part includes: a feedback controller configured to receive an input signal based on the deviation and output a feedback command value for calculating the fuel command value; a low-value selector configured to output a minimum command value between the feedback command value and at least one another command value calculated separately from the feedback command value; and a second upper-limit setting part configured to, if the difference between the output demand value and the actual output value becomes not greater than the threshold, limit the fuel command value to be not greater than an upper limit command value being an output value of the low-value selector at the time when the difference reaches the threshold.

With the above configuration (10), the fuel command value is determined on the basis of the minimum command value of the feedback command value from the feedback controller and at least one command value calculated separately from the feedback command value, and the fuel command value is limited to be not greater than the upper limit value, which is the output value of the low-value selector at the time when the difference between the output demand value and the actual output value reaches the threshold, when the difference becomes not greater than the threshold. Thus, it is possible to suppress excess of the turbine inlet temperature more reliably.

(11) In some embodiments, in any one of the above configurations (1) to (10), the command value calculation part includes: a feedback controller configured to receive an input signal based on the deviation and output a feedback command value for calculating the fuel command value; and a deviation upper-limit setting part configured to, if the difference between the output demand value and the actual output value becomes not greater than the threshold, limit the input signal of the feedback controller to zero.

With the above configuration (11), by limiting the input signal of the feedback controller to zero when the difference between the output demand value and the actual output value becomes not greater than the threshold, it is possible to suppress excess of the turbine inlet temperature more reliably.

(12) According to at least one embodiment of the present invention, a gas turbine includes: the control device according to any one of the above (1) to (11); a compressor for compressing air; a combustor for producing combustion gas from combustion reaction of a fuel and compressed air from the compressor; and a turbine to be driven by the combustion gas from the combustor. The control device is configured to control an output of the turbine.

With the above configuration (12), immediately before the difference between the actual output value and the output demand value becomes not greater than the threshold, a control is performed on the basis of the control target value set as a value larger than the actual output value. Thus, it is possible to ensure a large control deviation until the actual output value further approaches the output demand value (that is, until the difference between the output demand value and the actual output value reaches the threshold), even after the control target value reaches the output demand value. Accordingly, it is possible to improve the control responsiveness.

Furthermore, in the above configuration (12), the control target value is decreased to decrease the control deviation after the difference between the output demand value and the actual output value becomes not greater than the threshold. Thus, it is possible to calculate the fuel command value so as to suppress overshoot, and suppress excess of the flow rate of the fuel to be supplied to the gas turbine.

Thus, with the above configuration (12), it is possible to prevent excess of the turbine inlet temperature while enabling a rapid output increase of the gas turbine.

(13) According to at least one embodiment of the present invention, a method for controlling a gas turbine includes: a step of calculating a control target value being a target value of an output of the gas turbine; and a step of calculating a fuel command value on the basis of a deviation between the control target value and an actual output value of the gas turbine. The step of calculating the control target value includes: immediately before a difference between the output demand value and the actual output value becomes not greater than a threshold, setting the control target value to a value which is greater than an output demand value of the gas turbine; and decreasing the control target value from the value after the difference becomes not greater than the threshold.

According to the above method (13), immediately before the difference between the actual output value and the output demand value becomes not greater than the threshold, a control is performed on the basis of the control target value set as a value larger than the actual output value. Thus, it is possible to ensure a large control deviation until the actual output value further approaches the output demand value (that is, until the difference between the output demand value and the actual output value reaches the threshold), even after the control target value reaches the output demand value. Accordingly, it is possible to improve the control responsiveness.

Furthermore, according to the above method (13), the control target value is decreased to decrease the control deviation after the difference between the output demand value and the actual output value becomes not greater than the threshold. Thus, it is possible to calculate the fuel command value so as to suppress overshoot, and suppress excess of the flow rate of fuel to be supplied to the gas turbine.

Thus, according to the above method (13), it is possible to prevent excess of the turbine inlet temperature while enabling a rapid output increase of the gas turbine.

(14) In some embodiments, in the above method (13), the step of calculating the control target value includes: if a bias adding condition including that the difference is greater than the threshold is satisfied, calculating the control target value to be not greater than an upper limit value which is a sum of the output demand value and a bias value; and if the bias adding condition is not satisfied, calculating the control target value to be a value smaller than the sum of the output demand value and the bias value.

According to the above method (14), when the difference between the actual output value and the output demand value is greater than the threshold (that is, until immediately before the difference reaches the threshold), a control is performed on the basis of the control target value obtained by adding the bias value to the output demand value. Thus, it is possible to ensure a large control deviation until the actual output value further approaches the output demand value (that is, until the difference between the output demand value and the actual output value reaches the threshold), even after the control target value reaches the output demand value. Accordingly, it is possible to improve the control responsiveness.

Furthermore, according to the above method (14), the control target value is decreased to decrease the control deviation when the difference between the output demand value and the actual output value becomes not greater than the threshold by canceling the addition of the bias value in calculation of the control target value. Thus, it is possible to calculate the fuel command value so as to suppress overshoot, and suppress excess of the flow rate of the fuel to be supplied to the gas turbine.

Thus, according to the above method (14), it is possible to prevent excess of the turbine inlet temperature while enabling a rapid output increase of the gas turbine.

(15) In some embodiments, in the above method (14), the step of calculating the control target value includes: if the bias adding condition is satisfied, increasing the control target value toward the sum between the output demand value and the bias value at a constant rate; and if the bias adding condition is not satisfied, decreasing the control target value at a constant rate until the control target value reaches the output demand value.

According to the above method (15), the control target value is increased or decreased at a constant rate. Thus, compared to a case where the control target value is increased or decreased in a step pattern, for instance, it is possible to suppress a rapid change of the gas turbine output, and suppress damage to the gas turbine.

(16) In some embodiments, in the above method (14) or (15), the bias adding condition includes: a first condition that the difference is greater than the threshold; and at least one of: a second condition that an index of a turbine inlet temperature of the gas turbine is less than a threshold of the index; a third condition that an opening degree of an inlet guide vane of a compressor of the gas turbine is less than a full opening degree; or a fourth condition that an opening degree of a flow-rate regulating valve for regulating a fuel flow rate of the gas turbine is less than an upper limit value.

According to the above method (16), if at least one of the first condition or at least one of the second to fourth conditions is satisfied, a control is performed on the basis of the control target value obtained by adding the bias value to the output demand value.

That is, if the difference between the output demand value and the actual output value is greater than the threshold, or if the turbine inlet temperature is lower than the threshold (e.g. upper limit value), or if the opening degree of the inlet guide vane is less than the full opening degree, or if the opening degree of the flow-rate regulation valve is less than an upper limit value, a control is performed on the basis of the control target value obtained by adding the bias value to the output demand value, and thus it is possible to ensure a large control deviation and improve the control responsiveness.

Furthermore, if the difference between the output demand value and the actual output value is not greater than the threshold, or if the turbine inlet temperature reaches the threshold (e.g. upper limit value) or if the opening degree of the inlet guide vane reaches the full opening degree, or if the opening degree of the flow-rate regulation valve reaches the upper limit value, addition of the bias value for calculating the control target value is canceled, to reduce the control target value and reduce the control deviation. Thus, it is possible to calculate the fuel command value so as to suppress overshoot, and suppress excess of the flow rate of fuel to be supplied to the gas turbine 1 more reliably.

Thus, according to the above method (16), it is possible to prevent excess of the turbine inlet temperature more reliably while enabling a rapid output increase of the gas turbine.

(17) In some embodiments, in any one of the above methods (13) to (16), the step of calculating the fuel command value includes: a step of calculating a feedback command value for calculating the fuel command value on the basis of an input value based on the deviation; and a step of, if the difference between the output demand value and the actual output value becomes not greater than the threshold, limiting the fuel command value to be not greater than an upper limit command value being the feedback command value at the time when the difference reaches the threshold.

According to the above method (17), when the difference between the output demand value and the actual output value is not greater than the threshold, the fuel command value is limited to be not greater than the upper limit command value, which is the feedback command value at the time when the difference reaches the threshold. Thus, it is possible to suppress excess of the turbine inlet temperature reliably.

(18) In some embodiments, in the above method (17), the step of calculating the feedback command value includes: calculating the feedback command value on the basis of a proportional term and an integral term obtained from the deviation; and if the difference between the output demand value and the actual output value becomes not greater than the threshold, limiting an increase of the integral term and calculating the feedback command value.

According to the above method (18), when the difference between the output demand value and the actual output value becomes not greater than the threshold, the fuel command value is limited to be not greater than the upper limit command value, which is the feedback command value at the time when the difference reaches the threshold, and the feedback command value is calculated while limiting increase of the integral term. Thus, it is possible to prevent a phenomenon where saturation of integral calculation causes deterioration of the control responsiveness (wind up).

(19) In some embodiments, in any one of the above methods (13) to (16), the step of calculating the fuel command value includes: a step of calculating a feedback command value for calculating the fuel command value on the basis of an input value based on the deviation; a step of calculating a minimum command value between the feedback command value and at least one another command value calculated separately from the feedback command value; and a step of, if the difference between the output demand value and the actual output value becomes not greater than the threshold, limiting the fuel command value to be not greater than an upper limit command value being the minimum command value at the time when the difference reaches the threshold calculated in the low-value selection step.

According to the above method (19), the fuel command value is determined on the basis of the minimum command value of the feedback command value from the feedback controller and at least one command value calculated separately from the feedback command value, and the fuel command value is limited to be not greater than the upper limit value, which is the output value of the low-value selector at the time when the difference reaches the threshold, when the difference between the output demand value and the actual output value becomes not greater than the threshold. Thus, it is possible to suppress excess of the turbine inlet temperature more reliably.

(20) In some embodiments, in any one of the above methods (13) to (19), the step of calculating the fuel command value includes: a step of calculating a feedback command value for calculating the fuel command value on the basis of an input value based on the deviation; and a step of limiting the input signal in the step of, if the difference between the output demand value and the actual output value becomes not greater than the threshold, calculating the feedback command value to zero.

According to the above method (20), by limiting the input signal of the feedback controller to zero when the difference between the output demand value and the actual output value becomes not greater than the threshold, it is possible to suppress excess of the turbine inlet temperature more reliably.

Advantageous Effects

According to at least one embodiment of the present invention, provided is a control device for a gas turbine, a gas turbine, and a gas turbine control method capable of increasing the output of the gas turbine rapidly and preventing excess of the turbine inlet temperature.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

Figure 1:
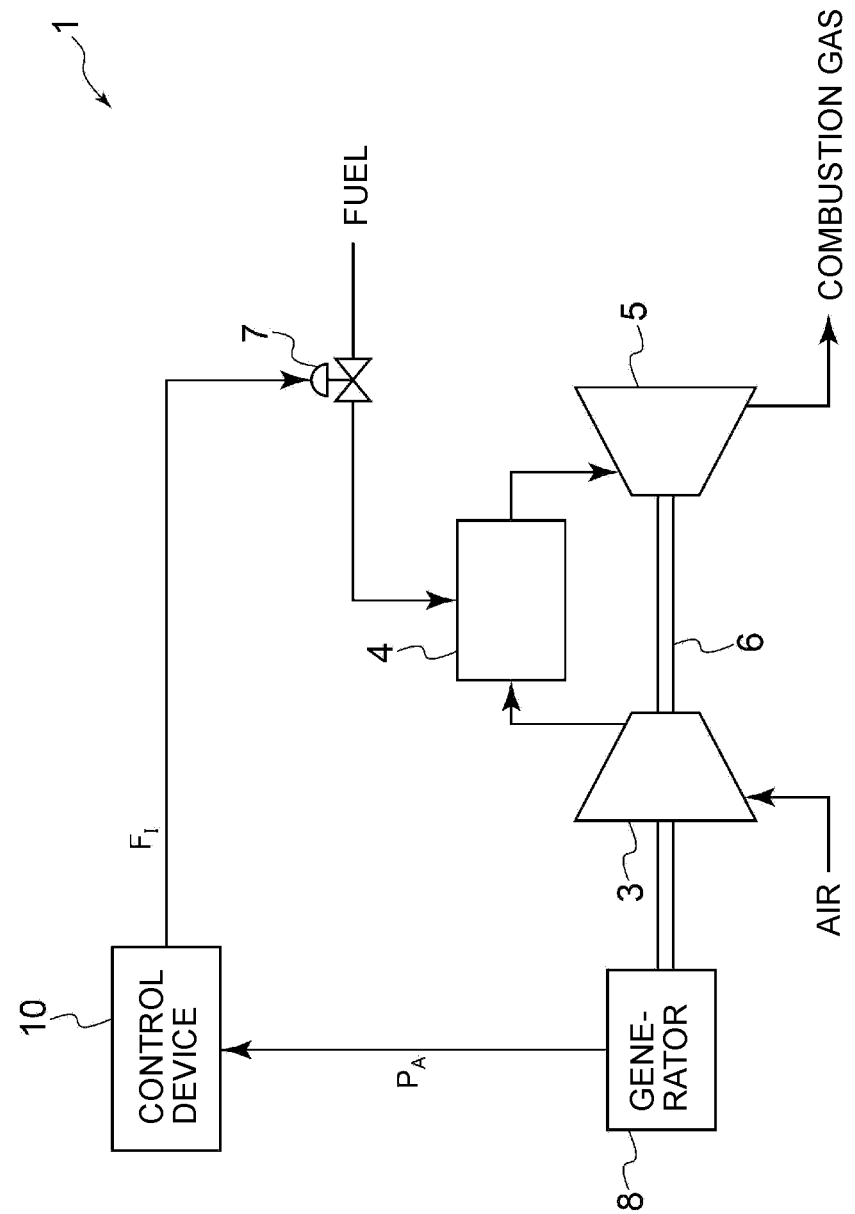
FIG. 1 is a schematic diagram of a gas turbine including a control device according to some embodiments.

FIG. 1 is a schematic diagram of a gas turbine including a control device according to some embodiments. As depicted in the drawing, the gas turbine 1 includes a compressor 3 for compressing air, a combustor 4 for producing combustion gas by combusting a fuel (e.g. natural gas), a turbine 5 configured to be rotary driven by combustion gas, and a control device 10 for controlling the output of the gas turbine 1.

The combustor 4 is configured to be supplied with a fuel (e.g. natural gas) and fed with compressed air from the compressor 3. The fuel is combusted using the compressed air as an oxidant, and thereby combustion gas is produced. The flow rate of the fuel supplied to the combustor 4 is regulatable with a flow-rate regulation valve 7 that serves as a flow-rate regulation unit.

A generator 8 is coupled to the turbine 5 via a rotational shaft 6. The generator 8 is driven by rotational energy of the turbine 5, and thereby electric power is generated. The combustion gas having worked at the turbine 5 is discharged from the turbine 5 as exhaust gas.

The electric power generated by the generator 8 may be transmitted to a utility grid via a non-depicted breaker or transformer, for instance.

The value of the power generated by the generator 8 (effective power; actual output value of the generator or the gas turbine) is measured by a non-depicted measuring device, and is sent to the control device 10 for feedback.

The control device 10 includes a non-depicted CPU and a memory. The control device 10 calculates a command value related to the flow rate of the fuel to be supplied to the combustor 4 (fuel command value $F_1$) on the basis of the actual output value $P_A$ or the like of the gas turbine 1 that the control device 10 receives. Further, the control device 10 is configured to regulate the opening degree of the flow-rate regulation valve 7 so that the flow rate of the fuel to be supplied to the combustor 4 matches the calculated fuel command value $F_1$.

In this way, the control device 10 controls the output of the gas turbine 1 (that is, controls the generator output).

Next, with reference to FIGS. 2 to 12, the control device 10 and a control method for the gas turbine 1 according to some embodiments will be described.

Figure 2:
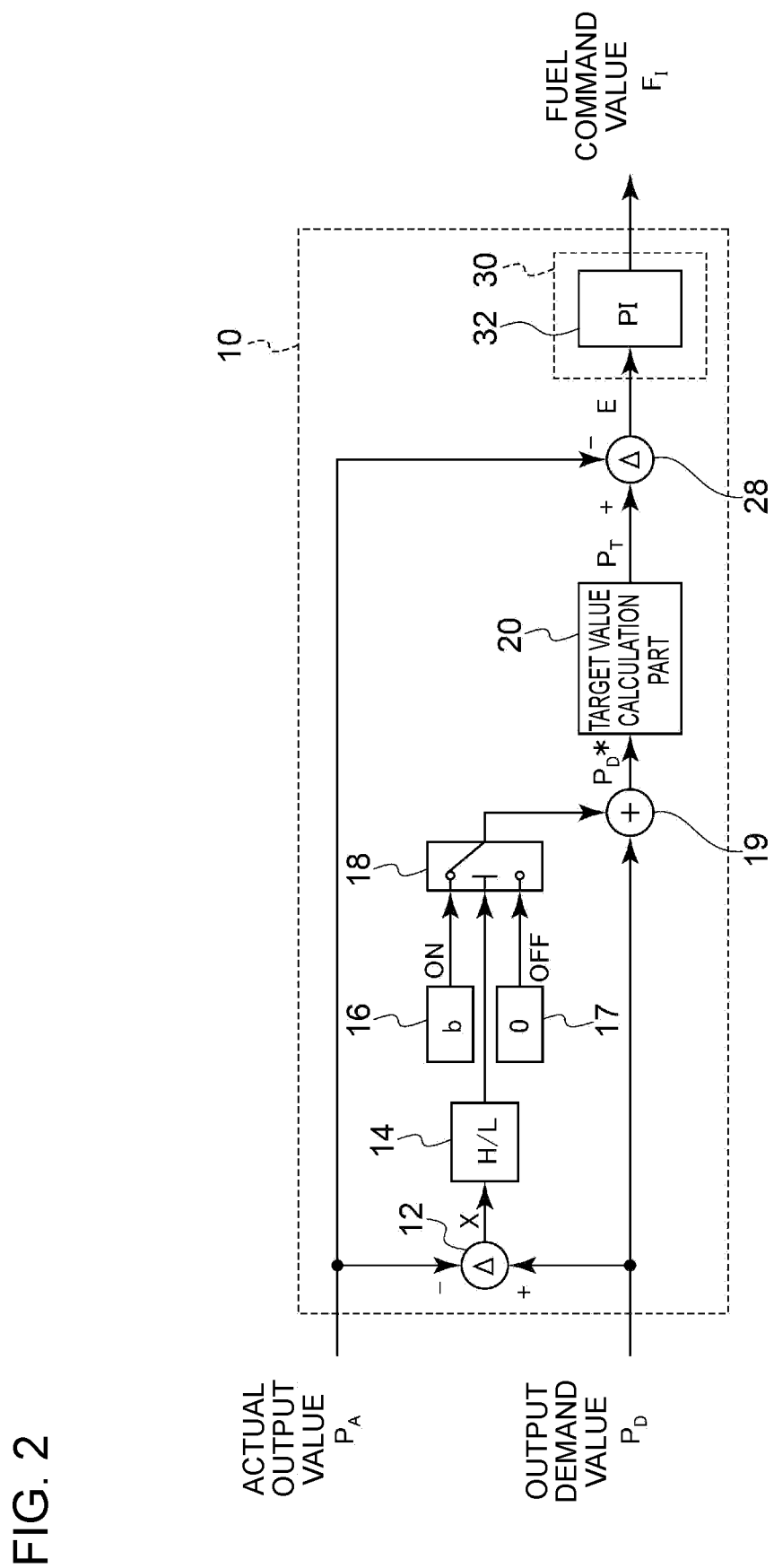
FIG. 2 is a configuration block diagram of a control device according to an embodiment.
Figure 3:
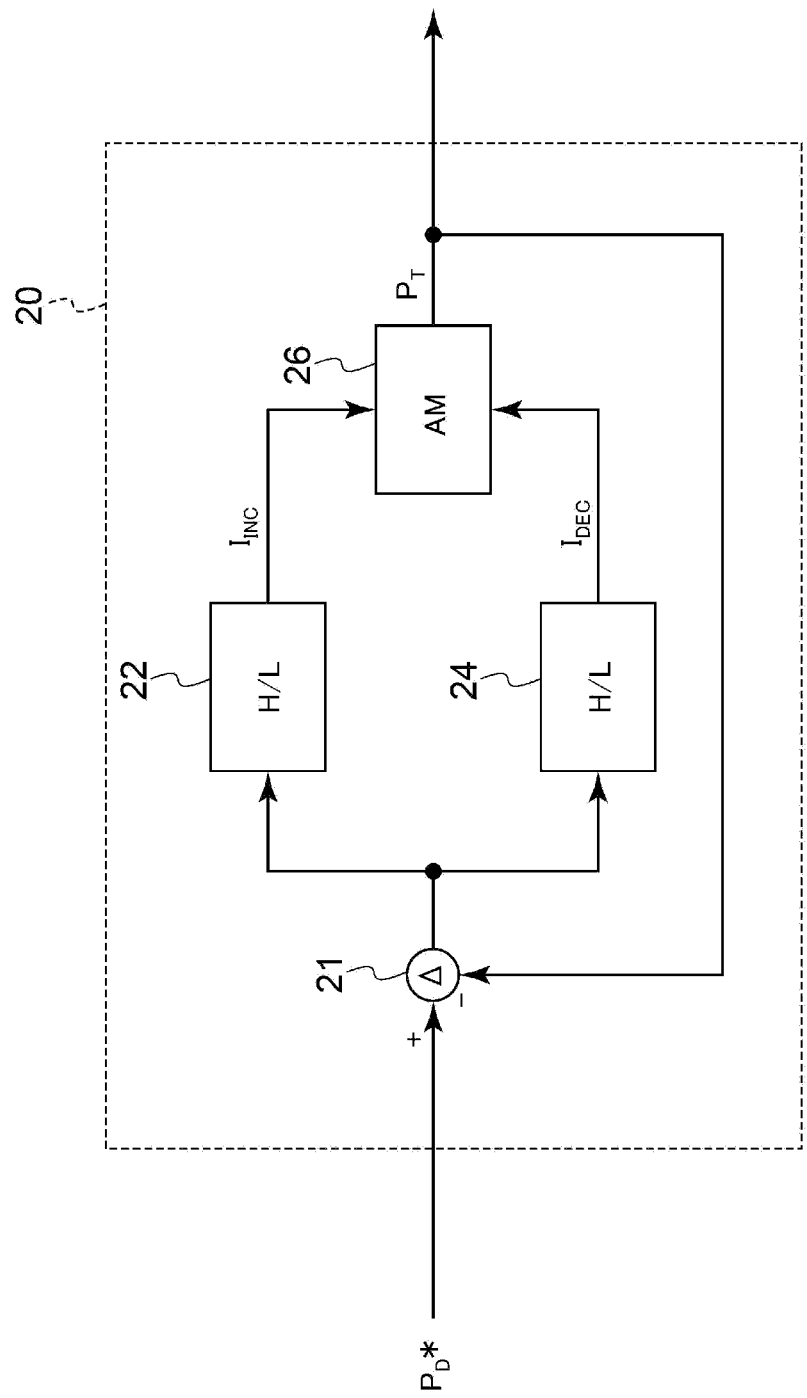
FIG. 3 is a block diagram showing the configuration of a target value calculation part of the control device according to an embodiment.
Figure 4:
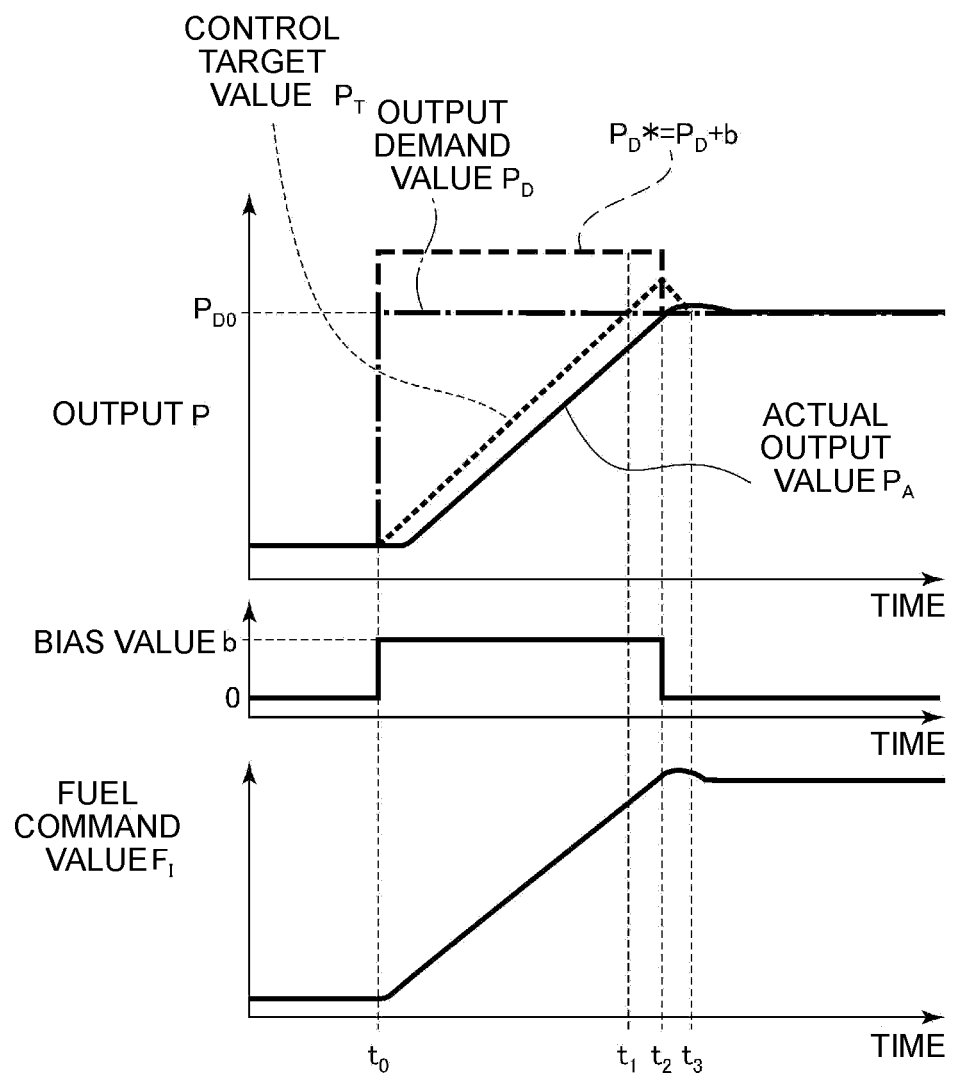
FIG. 4 is a diagram showing an example of temporal change of respective parameters related to the output control of the gas turbine.
Figure 5:
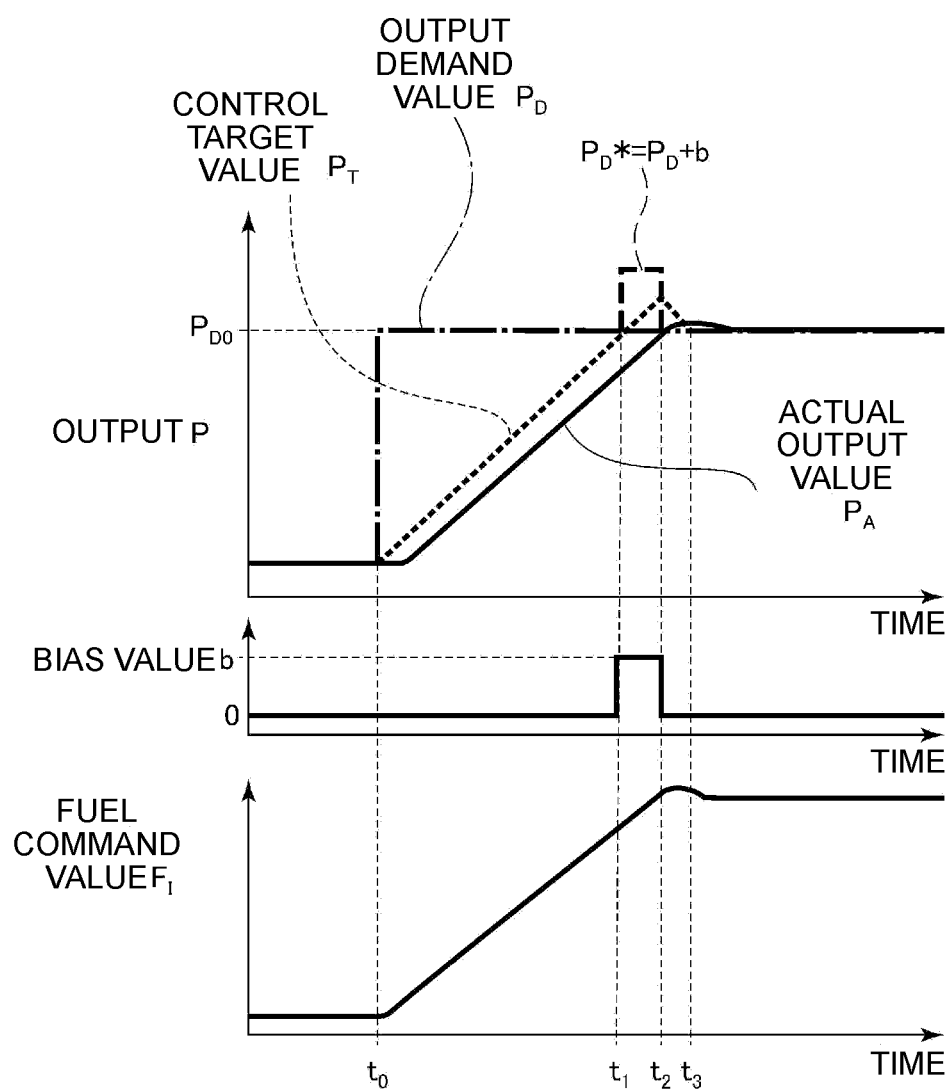
FIG. 5 is a diagram showing an example of temporal change of respective parameters related to the output control of the gas turbine.
Figure 6:
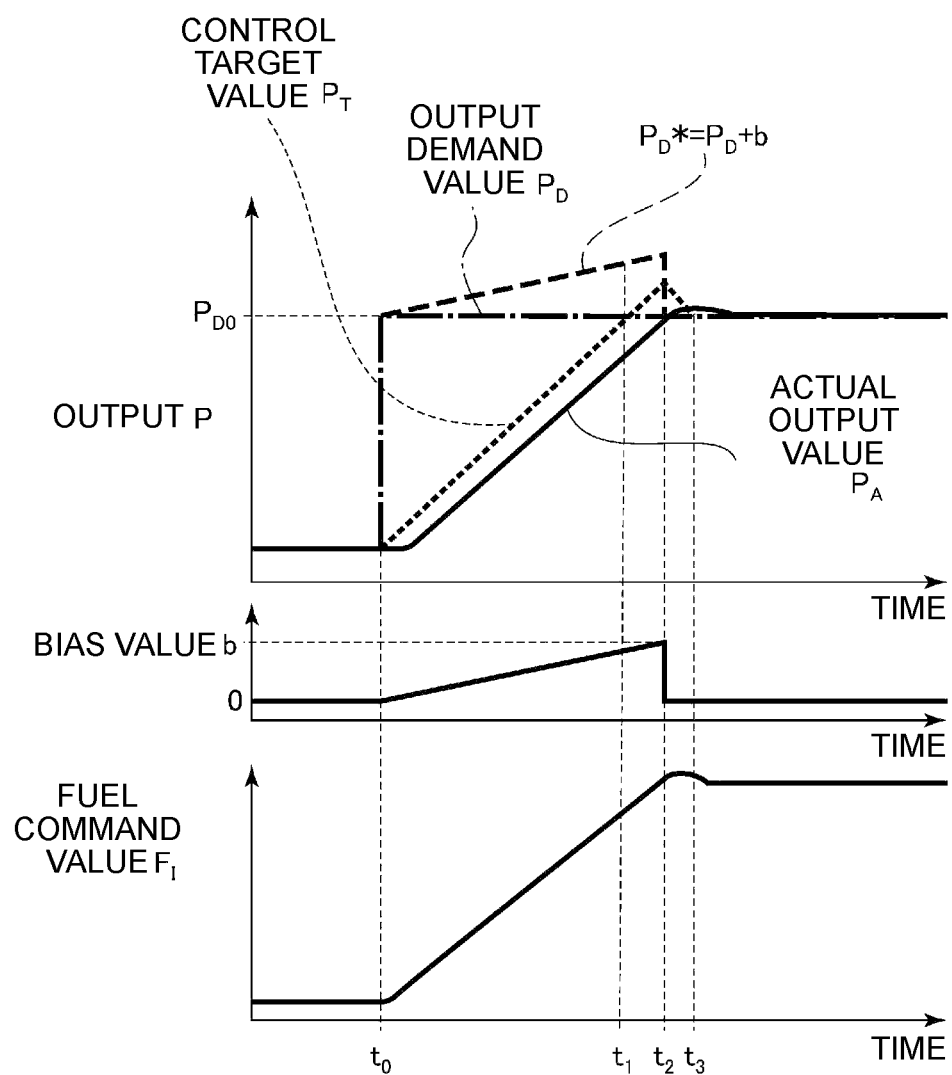
FIG. 6 is a diagram showing an example of temporal change of respective parameters related to the output control of the gas turbine.

FIG. 2 is a block diagram showing the configuration of a control device 10 according to an embodiment. FIG. 3 is a block diagram showing the configuration of a target value calculation part of the control device 10 according to an embodiment. FIGS. 4 to 6 are each a diagram showing an example of temporal change of respective parameters related to the output control of the gas turbine 1 at the time of start of the gas turbine 1.

As depicted in FIG. 2, the control device 10 according to an embodiment includes a target value calculation part 20 for calculating a control target value $P_T$ being a target value of the output of the gas turbine 1, and a command value calculation part 30 for calculating the fuel command value $F_1$ related to the flow rate of the fuel to be supplied to the combustor 4 of the gas turbine 1.

The target value calculation part 20 is configured to calculate the control target value $P_T$ on the basis of the output demand value $P_D$ of the gas turbine 1, the actual output value $P_A$ of the gas turbine 1, and a bias value 'b' described below.

The command value calculation part 30 is configured to calculate the fuel command value $F_1$ on the basis of the deviation between the control target value $P_T$ calculated by the target value calculation part 20 and the actual output value $P_A$ of the gas turbine 1.

The output demand value $P_D$ may be given to the control device 10 from outside (e.g. a superior control device).

As depicted in FIG. 2, to the target value calculation part 20, a correction demand value $P_D^*$ is input. The correction demand value $P_D^*$ is determined on the basis of the output demand value $P_D$ and the bias value 'b', as follows.

First, a subtractor 12 calculates a difference X between the output demand value $P_D$ and the actual output value $P_A$ (difference X=output demand value $P_D$–actual output value $P_A$).

Next, a comparator (high/low monitor) 14 compares the difference X and a threshold Xth. The threshold Xh may be a value in a range not smaller than 0% and not greater than 10% of the output demand value $P_D$, for instance.

If a bias adding condition that the above difference X is greater than the threshold Xth (X>Xth) is satisfied, the comparator 14 outputs a signal indicating "ON", which is received by a switch 18. The switch 18 reads out a bias value 'b' from a memory 16, and outputs the bias value 'b' to an adder 19. The adder 19 outputs a sum of the bias value 'b' being an output from the comparator 14 and the output demand value $P_D$ to the target value calculation part 20, as a correction demand value $P_D^*$.

On the other hand, if the above difference X is not greater than the threshold Xth (X≤Xth) (that is, if the above described bias adding condition is not satisfied), the comparator 14 outputs a signal indicating "OFF", which is received by the switch 18. The switch 18 reads out a zero value from a memory 17, and outputs the zero value to the adder 19. The adder 19 outputs a sum of the zero value being an output from the comparator 14 and the output demand value $P_D$ (that is, the output demand value $P_D$) to the target value calculation part 20, as a correction demand value $P_D^*$.

The target value calculation part 20 calculates the control target value $P_T$ on the basis of the correction demand value $P_D^*$ being an input from the adder 19. As depicted in FIG. 3, the target value calculation part 20 includes a subtractor 21, comparators (high/low monitors) 22, 24, and an analog memory 26.

The subtractor 21 calculates a load setting deviation, which is a deviation between the correction demand value $P_D^*$ received from the adder 19 (see FIG. 2) and the control target value $P_T$ being an output from the analog memory 26 (load setting deviation=correction demand value $P_D^*$−control target value $P_T$).

The comparator 22 determines whether the load setting deviation is smaller than a predetermined value (e.g. 0.1 MW), and if it is determined that the load setting difference is not smaller than the predetermined value (e.g. 0.1 MW), the comparator 22 outputs a control target value increasing command $I_{INC}$ to the analog memory 26. That is, the control target value increase command $I_{INC}$ becomes ON if the load setting deviation is not smaller than a predetermined value (e.g. 0.1 MW), and becomes OFF if the load setting deviation is smaller than a predetermined value (e.g. 0.1 MW).

Furthermore, the comparator 24 determines whether the load setting deviation is greater than a predetermined value (e.g. minus 0.1 MW), and if it is determined that the load setting difference is not greater than the predetermined value (e.g. minus 0.1 MW), the comparator 24 outputs a control target value decreasing command $I_{DEC}$ to the analog memory 26. That is, the control target value decrease command $I_{DEC}$ becomes ON if the load setting deviation is not greater than a predetermined value (e.g. minus 0.1 MW), and becomes OFF if the load setting deviation is greater than a predetermined value (e.g. minus 0.1 MW).

The analog memory 26 starts to increase the control target value $P_T$ when the control target value increase command $I_{INC}$ is input from the comparator 22 (when the control target value increase command $I_{INC}$ becomes ON), keeps increasing the control target value $P_T$ gradually at a predetermined increase rate (e.g. 10 Mw/min) while the control target value increase command INC is continuously input (while the control target value increase command $I_{INC}$ is ON), and stops increasing the control target value $P_T$ when the control target value increase command $I_{INC}$ is no longer input from the comparator 22 (when the control target value increase command INC becomes OFF).

Furthermore, while the control target value increase command $I_{INC}$ is continuously input, (while the control target value increase command INC is ON), the increase rate of the control target value $P_T$ may be constant (that is, the control target value $P_T$ may increase at a constant rate).

Furthermore, the analog memory 26 starts to decrease the control target value $P_T$ when the control target value decrease command $I_{DEC}$ is input from the comparator 24 (when the control target value decrease command $I_{DEC}$ becomes ON), keeps decreasing the control target value $P_T$ gradually at a predetermined decrease rate (e.g. minus 10 MW/min) while the control target value decrease command $I_{DEC}$ is continuously input (while the control target value decrease command $I_{DEC}$ is ON), and stops decreasing the control target value $P_T$ when the control target value decrease command $I_{DEC}$ is no longer input from the comparator 24 (when the control target value decrease command $I_{DEC}$ becomes OFF).

Furthermore, while the control target value decrease command $I_{DEC}$ is continuously input (while the control target value increase command $I_{DEC}$ is ON), the decrease rate of the control target value $P_T$ may be constant (that is, the control target value $P_T$ may decrease at a constant rate).

That is, the target value calculation part 20 calculates the control target value $P_T$ so as not exceed the correction demand value $P_D^*$.

Further, the control target value $P_T$ is output to the subtractor 21 and the subtractor 28 (see FIG. 2) from the analog memory 26.

Furthermore, as depicted in FIG. 2, the subtractor 28 calculates a deviation E between the control target value $P_T$ calculated by the target value calculation part 20 and the actual output value $P_A$ of the gas turbine 1 (deviation E=control target value $P_T$−actual output value $P_A$), and the calculated deviation E is input to the command value calculation part 30.

In an illustrative embodiment depicted in FIG. 2, the command value calculation part 30 is a feedback controller 32. The feedback controller 32 may be, for instance, a PI controller that calculates and outputs the fuel command value $F_1$ through proportional-integral calculation based on the deviation E received from the subtractor 28. Alternatively, the feedback controller 32 may be, for instance, a PID controller that calculates and outputs the fuel command value $F_1$ through proportional-integral-derivative calculation based on the deviation E received from the subtractor 28.

With the control device 10 (see FIG. 2) having the above configuration, at the time of start of the gas turbine 1, the temporal change of the parameter related to the output control is as depicted in FIG. 4, for instance. In the example described below, the threshold Xth compared to the difference X by the comparator 14 (see FIG. 12) is zero.

As depicted in FIG. 4, for instance, the output demand value $P_D$, the actual output value $P_A$, and the control target value $P_T$ are zero until time t0.

At time t0, the output demand value $P_D$ increases from 0 to $P_D0$ in a step pattern, and the difference X between the output demand value $P_D$ and the actual output value $P_A$ becomes greater than the threshold Xth (zero) after time t0 and until time t2. That is, in this period, the bias adding condition that the above difference X is greater than the threshold Xth is satisfied, and the adder 19 calculates a correction demand value $P_D^*$ by adding the bias value 'b' to the output demand value $P_D$ (=$P_D0$) ($P_D^*$=$P_D$+b).

Furthermore, from time t0 to t2, the target value calculation part 20 increases the correction demand value at a prescribed rate so as not to exceed the correction demand value $P_D^*$ calculated by the adder 19. That is, while the control target value $P_T$ reaches the output demand value $P_D$ (=$P_D0$) at time t1, which is later than time t0 and earlier than time t2, the control target value $P_T$ is continuously increased past the output demand value $P_D$ ($P_D0$) toward the correction demand value $P_D^*$, which is a sum of the output demand value $P_D$ and the bias value 'b'.

In the embodiment depicted in FIG. 4, from time t0 to t2, the target value calculation part 20 increases the control target value at a constant rate.

Furthermore, at time t2, the difference X between the output demand value $P_D$ and the actual output value reaches the threshold (zero), and then becomes not greater than the threshold (zero). That is, the above described bias adding condition is no longer satisfied. Thus, after time t2, the switch 18 cancels addition of the bias value 'b', and the adder 19 outputs the output demand value $P_D$ (=$P_D$0) as the correction demand value $P_D$*.

Furthermore, after time t2, the target value calculation part 20 decreases the control target value $P_T$ at a prescribed rate until reaching the output demand value $P_D$ (that is, to time t3). That is, the target value calculation part 20 calculates the control target value $P_T$ as a value smaller than the sum of the output demand value $P_D$ and the bias value 'b'.

In the embodiment depicted in FIG. 4, from time t2 to t3, the target value calculation part 20 decreases the control target value at a constant rate.

As described above, in the above described embodiments, when the difference X between the output demand value $P_D$ and the actual output value $P_A$ is greater than the threshold Xth (time t0 to t2), especially, immediately before the difference X becomes not greater than the threshold Xth (e.g. from the time t1 when the control target value $P_T$ reaches the output demand value $P_D$ to time t2 when the actual output value $P_A$ reaches the output demand value $P_D$), the control target value $P_T$ is set to be a value greater than the output demand value $P_D$. Thus, even after time t2 when the control target value $P_T$ reaches the output demand value $P_D$, it is possible to ensure a large control deviation until the actual output value $P_A$ farther approaches the output demand value $P_D$ (that is, until time t2 when the difference X between the output demand value $P_D$ and the actual output value $P_A$ reaches the threshold Xth). Accordingly, it is possible to improve the control responsiveness.

Furthermore, in the above described embodiment, the control target value $P_T$ is decreased after the difference X between the output demand value $P_D$ and the actual output value $P_A$ becomes not greater than the threshold Xth (after time t2). Thus, it is possible to calculate the fuel command value $F_1$ so as to suppress overshoot, and suppress excess of the flow rate of the fuel to be supplied to the gas turbine 1.

Thus, it is possible to prevent excess of the turbine inlet temperature while enabling a rapid output increase of the gas turbine 1.

Moreover, the above embodiment focuses on the difference X between the output demand value $P_D$ and the actual output value $P_A$ to decide the timing to add the bias value 'b' to the output demand value $P_D$ and the timing to cancel the addition on the basis of the difference X. Thus, it is possible to improve the responsiveness of the output control of the gas turbine 1 better than typical methods, and suppress excess of the turbine inlet temperature more reliably.

In the above example described with reference to FIG. 4, the bias value to be added to the output demand value $P_D$ by the adder 19 is constant at 'b' during the period from time t0 to time t2 in which the difference X between the output demand value $P_D$ and the actual output value $P_A$ is greater than the threshold Xth. Nevertheless, the setting of the bias value is not limited to this, and may be as depicted in FIG. 5 or 6.

In the example depicted in FIG. 5, of the period from time t0 to t2 in which the difference X between the output demand value $P_D$ and the actual output value $P_A$ is greater than the threshold Xth, the bias value 'b' is set to be added to the output demand value $P_D$ by the adder 19 only in the period immediately before the difference X becomes not greater than the threshold Xth, that is, the period from time t1 when the control target value $P_T$ reaches the output demand value $P_D$ to time t2 when the actual output value $P_A$ reaches the output demand value $P_D$.

This is for the following reason. That is, during the period immediately before the difference X becomes not greater than the threshold Xth (e.g. period from time t1 to t2), the difference between the output demand value $P_D$ and the actual output value $P_A$ is extremely smaller than that in the period before time t1. Thus, in this period, setting the control target value $P_T$ to be greater by adding the bias value makes it possible to increase the deviation E between the actual output value $P_A$ and the control target value $P_T$ to be given to the command value calculation part 30, and thus is important in enhancing the control responsiveness.

Furthermore, in the period (e.g. after time t0 and before time t1) before the period immediately before the difference X becomes not greater than the threshold Xth (e.g. from time t1 to time t2), the difference between the output demand value $P_D$ and the actual output value $P_A$ is relatively large, and thus the deviation to be given to the command value calculation part 30 is relatively large. Thus, the necessity to increase the control target value $P_T$ by adding the bias value is relatively low. Thus, by adding the bias value 'b' to the output demand value $P_D$ only in the period when there is a high necessity of increasing the control deviation by adding the bias value, that is, the period immediately before the difference X becomes not greater than the threshold Xth (e.g. from time t1 to t2) as depicted in FIG. 5, of the period from time t0 to time t2 in which the difference X is greater than the threshold Xth, it is possible to suppress excess of the fuel command value calculated by the command value calculation part 30 in the foregoing period reliably, and suppress excess of the flow rate of the fuel to be supplied to the gas turbine 1 more reliably.

Furthermore, in the example depicted in FIG. 6, in the period from time t0 to time t2 in which the difference X between the output demand value $P_D$ and the actual output value $P_A$ is greater than the threshold Xth, the bias value to be added to the output demand value $P_D$ by the adder 19 is set to increase gradually from zero to 'b'.

Also in this case, the bias value is set to increase in the period immediately before the difference X becomes not greater than the threshold Xth (e.g. time t1 to t2), and thus, in this period, it is possible to set the control target value $P_T$ to be greater by adding the bias value, and to increase the deviation E between the actual output value $P_A$ and the control target value $P_T$ to be given to the command value calculation part 30.

Furthermore, by gradually increasing the bias value to be added to the output demand value $P_D$, it is possible to suppress a rapid increase of the fuel command value calculated by the command value calculation part 30. Thus, it is possible to suppress excess of the flow rate of fuel to be supplied to the gas turbine 1 more reliably.

Furthermore, in each example described in FIGS. 4 to 6, the bias value is set differently. Nevertheless, if the bias value to be added is increased to some extent in the period immediately before the difference X between the output demand value $P_D$ and the actual output value $P_A$ becomes not greater than the threshold Xth (e.g. period from time t1 to t2), the fuel command value to be obtained by the control device 10 would be substantially the same in any of the examples.

In the above described embodiment, when the bias adding condition is satisfied, the bias value is added to the output demand value by the adder 19 to obtain the correction demand value $P_D^*$. By using the accordingly obtained correction demand value $P_D^*$ as an upper limit, the target value calculation part 20 calculates the control target value $P_T$. When the bias adding condition is no longer satisfied, the addition of the bias value by the adder 19 is canceled, and the target value calculation part decreases the correction demand value to be calculated.

Furthermore, in the above described embodiment, the bias adding condition is the first condition that the difference X between the output demand value $P_D$ from the actual output value $P_A$ is greater than the threshold Xth.

In some embodiments, the bias adding condition may include the above described first condition and the second condition that the turbine inlet temperature of the gas turbine 1 is less than a threshold.

That is, satisfying the bias adding condition may refer to satisfying at least one of the first condition or the second condition.

Furthermore, not satisfying the bias adding condition may refer to not satisfying at least one of the first condition or the second condition.

As described above, if at least one of the first condition or the second condition is satisfied, a control is performed on the basis of the control target value $P_T$ obtained by adding the bias value 'b' to the output demand value $P_D$.

That is, if the difference X between the output demand value $P_D$ and the actual output value $P_A$ is greater than the threshold Xth, or if the turbine inlet temperature is lower than the threshold (e.g. upper limit value), a control is performed on the basis of the control target value $P_T$ obtained by adding the bias value 'b' to the output demand value $P_D$, and thus it is possible to ensure a large control deviation and improve the control responsiveness.

Furthermore, if at least one of the first condition or the second condition is not satisfied, a control is performed on the basis of the control target value $P_T$ obtained without adding the bias value to the output demand value $P_D$.

That is, even in a case where the difference X between the output demand value $P_D$ and the actual output value $P_A$ is still greater than the threshold Xth, if the turbine inlet temperature reaches the threshold (e.g. upper limit value), addition of the bias value 'b' for calculating the control target value $P_T$ is canceled, to reduce the control target value $P_T$ and reduce the control deviation. Thus, it is possible to calculate the fuel command value so as to suppress overshoot, and suppress excess of the flow rate of fuel to be supplied to the gas turbine more reliably.

Furthermore, the second condition may be that an index of the turbine inlet temperature of the gas turbine 1 (including the turbine inlet temperature itself) is less than the threshold. That is, in case it is difficult to measure the turbine inlet temperature directly, an index based on a measurement value related to the turbine inlet temperature may be used as an assessment criterion.

Furthermore, the above described bias adding condition may include the following third condition or fourth condition, instead of the second condition that an index of the turbine inlet temperature of the gas turbine 21 is less than the threshold, or in addition to the first condition and the second condition.

The third condition is that the opening degree of an inlet guide vane (IGV) of the compressor 3 of the gas turbine 1 is less than the full opening degree.

The fourth condition is that the opening degree of the flow-rate regulation valve 7 for adjusting the flow rate of fuel to be supplied to the combustor 4 is less than the upper limit value.

As described above, with the bias adding condition including a plurality of conditions, even in a case where the first condition that the difference X between the output demand value $P_D$ and the actual output value $P_A$ is greater than the threshold Xth is not satisfied, if any one of the second to fourth conditions is not satisfied, it is possible to cancel addition of the bias value 'b' for calculating the control target value $P_T$, and reduce the control target value $P_T$ to reduce the control deviation. Thus, it is possible to calculate the fuel command value so as to suppress overshoot, and suppress excess of the flow rate of fuel to be supplied to the gas turbine more reliably.

FIGS. 7 and 9 to 11 are each a configuration block diagram showing the configuration of a control device 10 according to an embodiment. FIG. 8 is a diagram showing an example of temporal change of respective parameters related to the output control of the gas turbine 1 at the time of start of the gas turbine 1, when using the respective control devices 10 depicted in FIGS. 7 and 9 to 11.

In the block diagrams depicted in FIGS. 7 and 9 to 11, the target value calculation part 20 calculates the control target value $P_T$ on the basis of the actual output value $P_A$, the output demand value $P_D$, and the bias value 'b', etc., and the subtractor 28 calculates the deviation E between the control target value $P_T$ and the actual output value $P_A$ and inputs the deviation E to the command value calculation part 30. The above is similar to the block diagram depicted in FIG. 2.

Furthermore, when the difference X between the output demand value $P_D$ and the actual output value $P_A$ is greater than the threshold Xth (X>Xth) (that is, when the bias adding condition is satisfied), the calculation result of the fuel command value $F_I$ obtained by the control device 10 depicted in FIGS. 7 and 9 to 11 is the same as that of the control device 10 in FIG. 2 (that is, the graphs in FIG. 3 and FIG. 8 show the same behavior during the period from time t0 to time t2).

Therefore, in the following description, the embodiments depicted in FIGS. 7, and 9 to 11 will be described focusing mainly on the command value calculation part 30.

Figure 7:
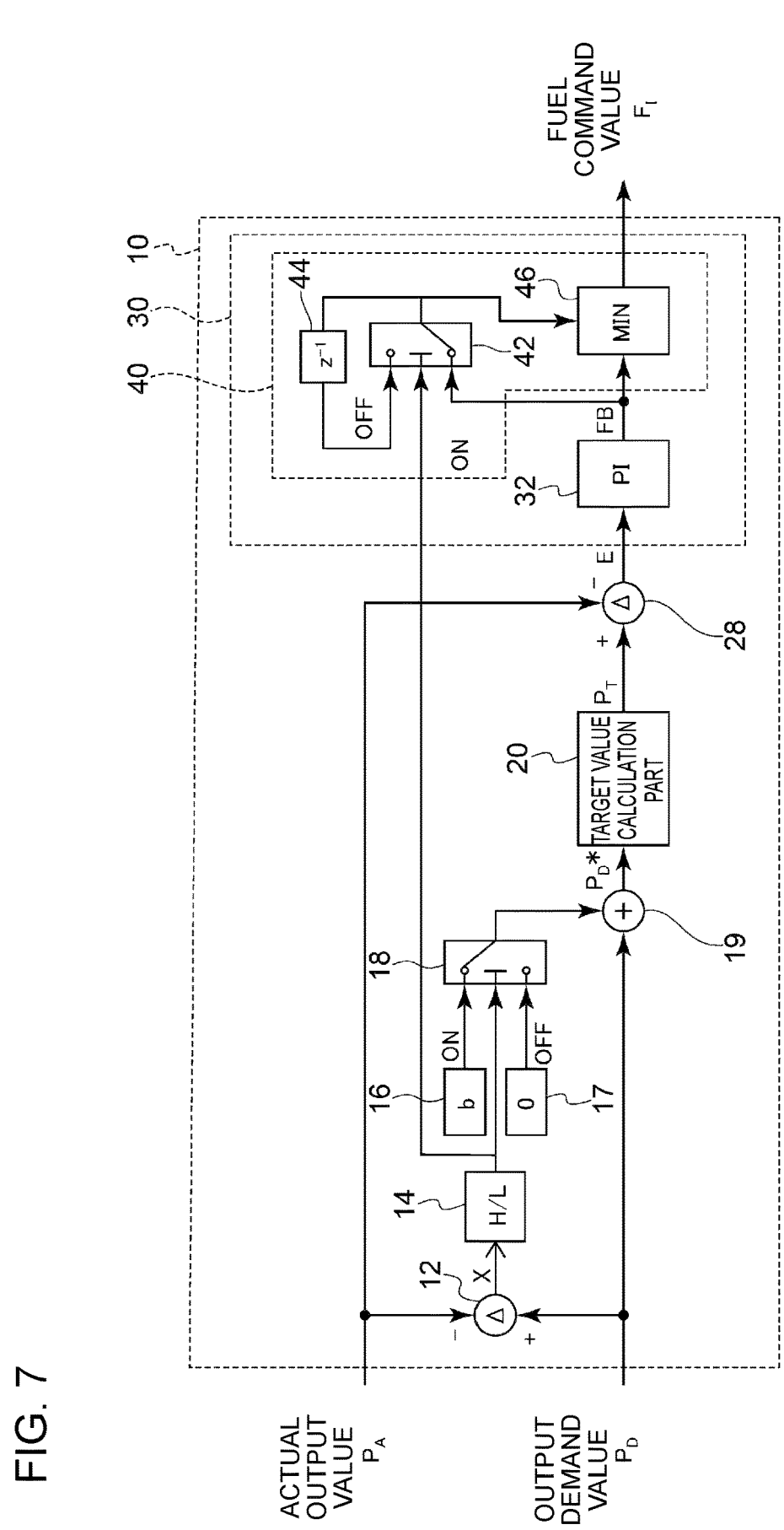
FIG. 7 is a block diagram showing the configuration of a control device according to an embodiment.
Figure 8:
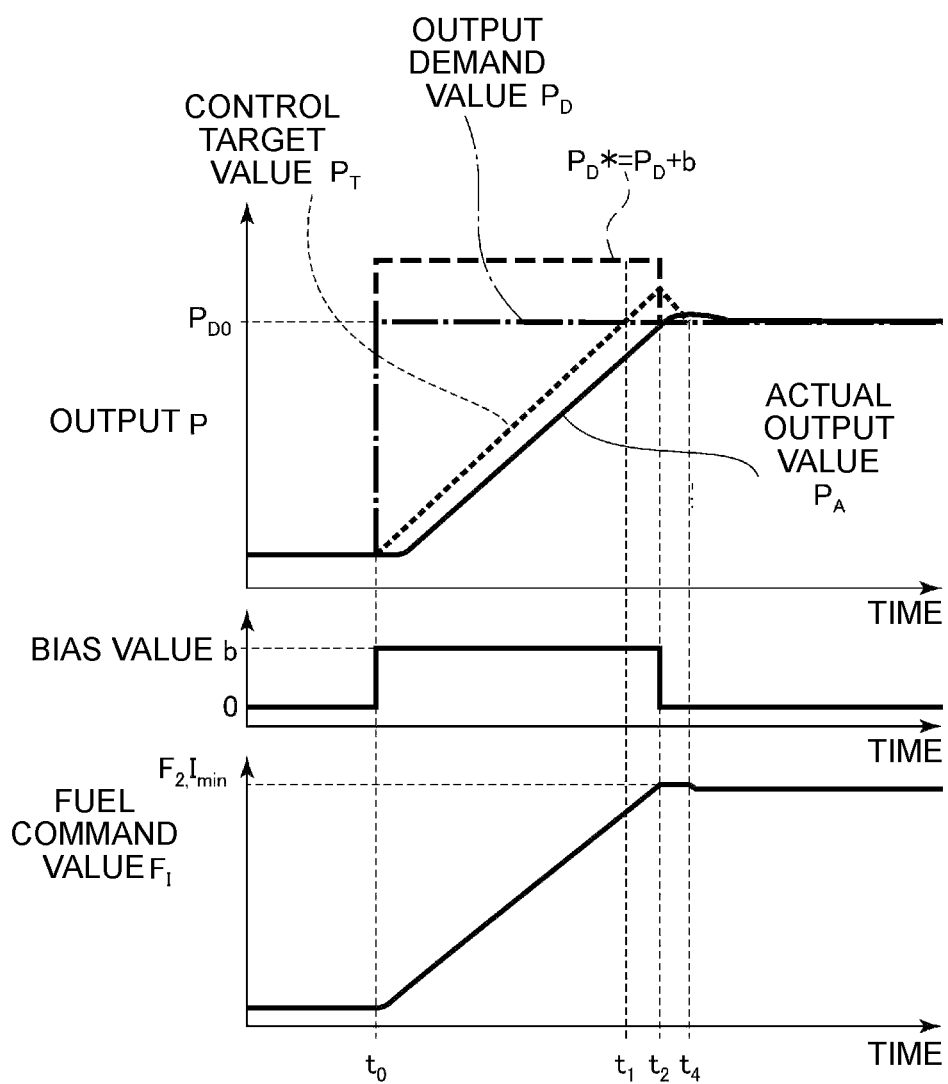
FIG. 8 is a diagram showing an example of temporal change of respective parameters related to the output control of the gas turbine.
Figure 9:
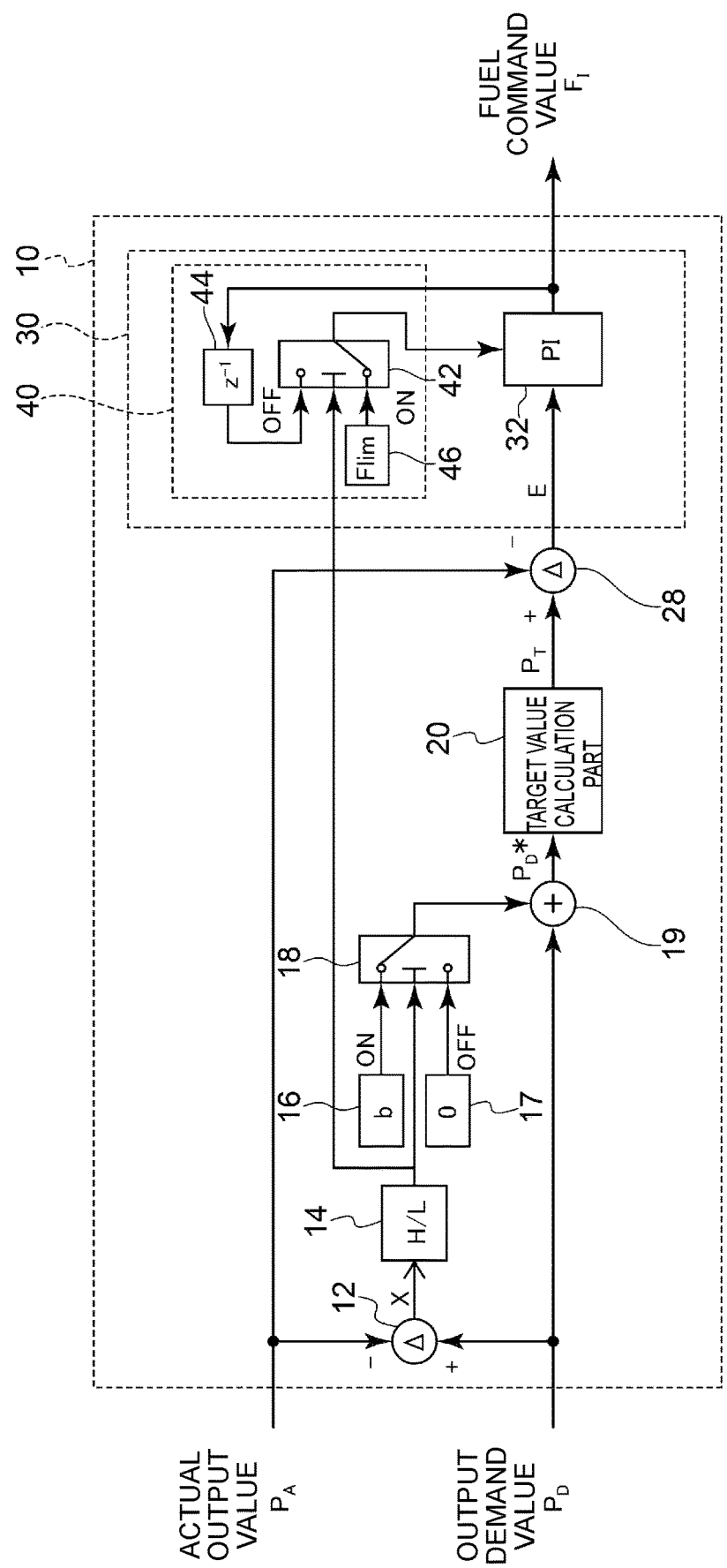
FIG. 9 is a block diagram showing the configuration of a control device according to an embodiment.

In the illustrative embodiments depicted in FIGS. 7 and 9, the command value calculation part 30 includes a feedback controller 32 and the first upper-limit setting part 40.

The feedback controller 32 is configured to receive an input signal based on the deviation E between the control target value $P_T$ and the actual output value $P_A$, and output a feedback command value FB for calculating the fuel command value $F_I$.

In an embodiment, the feedback controller 32 may be, for instance, a PI controller that calculates and outputs the feedback command value FB through proportional-integral calculation based on the deviation E received from the subtractor 28. Alternatively, in an embodiment, the feedback controller 32 may be, for instance, a PID controller that calculates and outputs the feedback command value FB through proportional-integral-differential calculation based on the deviation E received from the subtractor 28.

The first upper-limit setting part 40 is configured to limit the fuel command value $F_I$ to be not greater than the upper limit command value, which is the feedback command value FB at the time when the difference X reaches the threshold Xth, when the difference X between the output demand value $P_D$ and the actual output value $P_A$ becomes not greater than the threshold Xth (that is, when the bias adding condition is no longer satisfied).

In the illustrative embodiment depicted in FIG. 7, the first upper-limit setting part 40 includes a switch 42 and a low-value selector 46, and the feedback command value FB calculated by the feedback controller 32 is input to the low-value selector 46.

As a result of comparison between the difference X and the threshold Xth by the comparator 14, when the difference X is greater than the threshold Xth (X>Xth)(that is, when the bias adding condition is satisfied), the comparator 14 outputs a signal indicating "ON" to the switch 42. Upon receiving the signal, the switch 42 stores the feedback command value FB received from the feedback controller 32 in the memory 44, and outputs the feedback command value FB to the low-value selector 46.

The low-value selector 46 receives the same value (feedback command value FB) from both of the feedback controller 32 and the switch 42, and thus outputs the feedback command value FB as the fuel command value $F_I$.

Meanwhile, the feedback controller 32 repetitively calculates the feedback command value FB, and in principle, the calculated feedback command value FB (fuel command value $F_I$) increases gradually as depicted in FIG. 3 and the like while the condition that the difference X is greater than the threshold Xth is satisfied.

On the other hand, as a result of comparison between the difference X and the threshold Xth by the comparator 14, when the difference X is not greater than the threshold Xth (X≤Xth)(that is, if the bias adding condition is not satisfied), the comparator 14 outputs a signal indicating "OFF" to the switch 42. Upon receiving the signal, the switch 42 outputs the feedback command value $Z^{-1}$ (the previous calculation result of the feedback controller 32) stored in the memory 44 to the low-value selector 46.

The low-value selector 46 outputs, as the fuel command value $F_I$, the smaller one of the feedback command value FB outputted by the feedback controller 32 (the current calculation result) and the previous feedback command value $Z^{-1}$ outputted by the switch 42.

That is, as depicted in FIG. 8, in the period from time t2 when the actual output value $P_A$ reaches the output demand value $P_D$ to time t4, the difference X between the output demand value $P_D$ and the actual output value $P_A$ is not greater than the threshold Xth. In the same period, the control target value $P_T$ is greater than the actual output value $P_A$. Thus, in this period, the memory 44 (see FIG. 7) stores the feedback command value F2 at time t2 when the actual output value $P_A$ reaches the output demand value $P_D$. Further, the feedback command value F2 is smaller than the feedback command value FB that the feedback controller 32 newly calculates in the above period (t2 to t4), and thus the low-value selector 46 selects and outputs the feedback command value F2 as the fuel command value $F_I$ in this period.

That is, the fuel command value $F_I$ is held at the feedback command value F2 calculated at time t2 for a while after time t2 when the difference X becomes not greater than the threshold Xth.

According to the above embodiment, the fuel command value $F_I$ is limited to be not greater than the upper limit value, which is the feedback command value FB when the difference X reaches the threshold Xth (in the above example, the feedback command value F2 calculated at time t2), when the difference X between the output demand value $P_D$ and the actual output value $P_A$ becomes not greater than the threshold Xth. Thus, it is possible to suppress excess of the turbine inlet temperature more reliably.

In the illustrative embodiment depicted in FIG. 9, the feedback controller 32 is a PI controller that calculates the feedback command value FB on the basis of the proportional term and the integral term obtained from the deviation E between the control target value $P_T$ and the actual output value $P_A$. Further, the PI controller is configured to limit an increase of the integral term and calculate the feedback command value FB if the difference X between the output demand value $P_D$ and the actual output value $P_A$ becomes not greater than the threshold Xth.

More specifically, in the embodiment depicted in FIG. 9, the first upper-limit setting part 40 includes the switch 42. The switch 42 imposes an upper limit on the fuel command value FI outputted by the PI controller, in response to the comparison result between the difference X and the threshold Xth by the comparator 14.

For instance, as a result of comparison between the difference X and the threshold Xth by the comparator 14, if the difference X is greater than the threshold Xth (X>Xth) (that is, if the bias adding condition is satisfied), the switch 42 gives a pre-set normal upper limit value $F_{lim}$ to the PI controller as an upper limit value. On the other hand, as a result of comparison between the difference X and the threshold Xth by the comparator 14, if the difference X is not greater than the threshold Xth (X≤Xth)(that is, if the bias adding condition is not satisfied), the switch 42 gives the feedback command value $Z_{-1}$ previously calculated by the PI controller to the PI controller as an upper limit value.

Further, the PI controller 32 imposes a limit on the calculated feedback command value FB with the upper limit value given by the switch 42, and outputs the feedback command value FB as the fuel command value $F_I$.

That is, also in the embodiment depicted in FIG. 9, similarly to the embodiment depicted in FIG. 7, during the period from time t2 when the actual output value $P_A$ reaches the output demand value $P_D$ to time t4, the memory 44 (see FIG. 9) stores the feedback command value F2 (fuel command value $F_I$) at time t2 when the actual output value $P_A$ reaches the output demand value $P_D$. The feedback command value F2 (fuel command value $F_I$) is smaller than the feedback command value FB (fuel command value $F_I$) newly calculated by the feedback controller 32 in the above period (t2 to t4). Thus, during this period, the feedback command value FB calculated by the PI controller 32 is limited by the upper limit value from the switch 42, that is, the feedback command value F2 (the fuel command value $F_I$ at time t2), and the feedback command value F2 is outputted from the PI controller 32.

Further, the PI controller 32 is configured to limit an increase of the integral term and calculate the feedback command value FB during the above period (t2 to t4; i.e., when the difference X between the output demand value $P_D$ and the actual output value $P_A$ is not greater than the threshold Xth).

In a case where the fuel command value $F_I$ outputted from the PI controller 32 is limited to be not greater than the upper limit value (feedback command value F2) as described above (where the fuel command value $F_I$ is held), integrating the integral term without stopping the calculation of the integral term with the PI controller 32 may cause significant accumulation of integration when the hold of the fuel command value $F_I$ is canceled (see time t4 in FIG. 8), which may cause an excessive increase of the fuel command value $F_I$ and decrease of the control responsiveness.

In this regard, with the above described embodiment, when the difference X between the output demand value $P_D$ and the actual output value $P_A$ is not greater than the threshold Xth, the fuel command value $F_I$ is limited to be not greater than the upper limit command value F2, which is the feedback command value FB at the time when the difference X reaches the threshold Xth, and the feedback command value is calculated while limiting increase of the integral term. Thus, it is possible to prevent a phenomenon where the saturation of integral calculation causes deterioration in the control responsiveness (wind up).

The above process to limit the increase of the integral term may be performed when the above difference X becomes not greater than the threshold Xth (that is, when the hold of the fuel command value $F_I$ is started), and the deviation between the control target value $P_T$ and the actual output value $P_A$ is greater than zero. That is, only the increase-oriented integral calculation may be stopped. In this way, it is possible to prevent saturation of integral calculation reliably.

Figure 10:
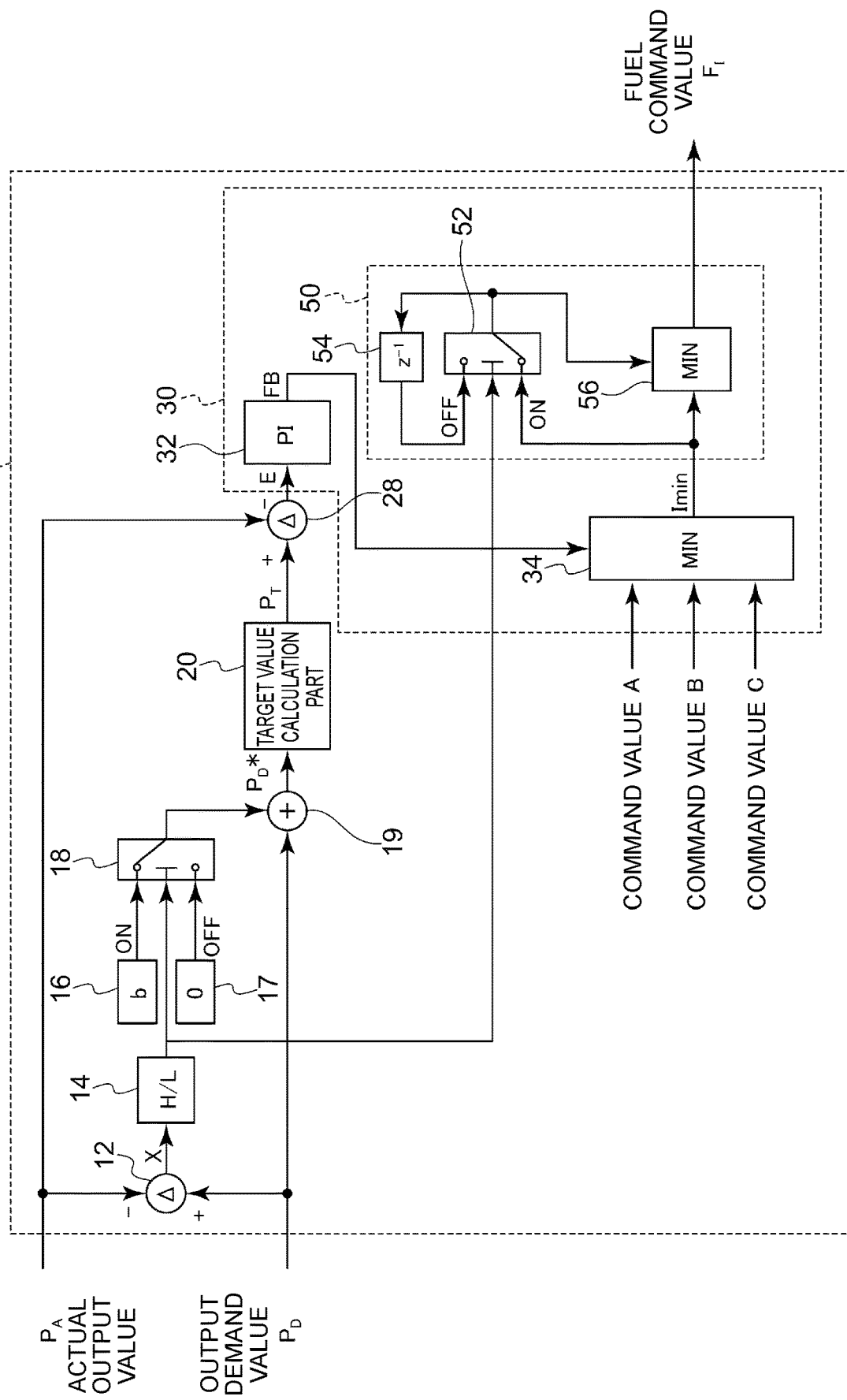
FIG. 10 is a block diagram showing the configuration of a control device according to an embodiment.

In an illustrative embodiment depicted in FIG. 10, the command value calculation part 30 includes a feedback controller 32, a low-value selector 34, and the second upper-limit setting part 50.

The feedback controller 32 is configured to receive an input signal based on the deviation E from the subtractor 28, and output a feedback command value FB for calculating the fuel command value $F_I$. The feedback controller 32 may be a PI controller or a PID controller, for instance.

The low-value selector 34 calculates and outputs a command value $I_{min}$, the minimum of the feedback command value FB from the feedback controller 32 and at least one another command value (command values A to C in FIG. 10) calculated separately from the feedback command value FB.

Herein, the at least one command value (command values A to C) calculated separately from the feedback command value FB may be an output from another control logic, for instance, for example a governor control command value or a temperature control command value.

The second upper-limit setting part 50 includes a switch 52 and a memory 54, and is configured to function similarly to the low-value selector 46. Specifically, the second upper-limit setting part 50 is configured to limit the fuel command value $F_I$ to be not greater than the upper limit value $I_{min}$, which is the output value of the low-value selector 34 at the time when the difference X reaches the threshold Xth, when the difference X between the output demand value $P_D$ and the actual output value $P_A$ becomes not greater than the threshold Xth. The temporal change of the fuel command value $F_I$ is as shown in the graph in FIG. 8.

According to the above embodiment, the fuel command value $F_I$ is determined on the basis of the minimum command value $I_{min}$ of the feedback command value FB from the feedback controller 32 and at least one command value (command values A to C in FIG. 10) calculated separately from the feedback command value FB, and the fuel command value $F_I$ is limited to be not greater than the upper limit value $I_{min}$, which is the output value of the low-value selector 34 at the time when the difference X reaches the threshold Xth, when the difference X between the output demand value $P_D$ and the actual output value $P^A$ becomes not greater than the threshold Xth. Thus, it is possible to suppress excess of the turbine inlet temperature more reliably.

Figure 11:
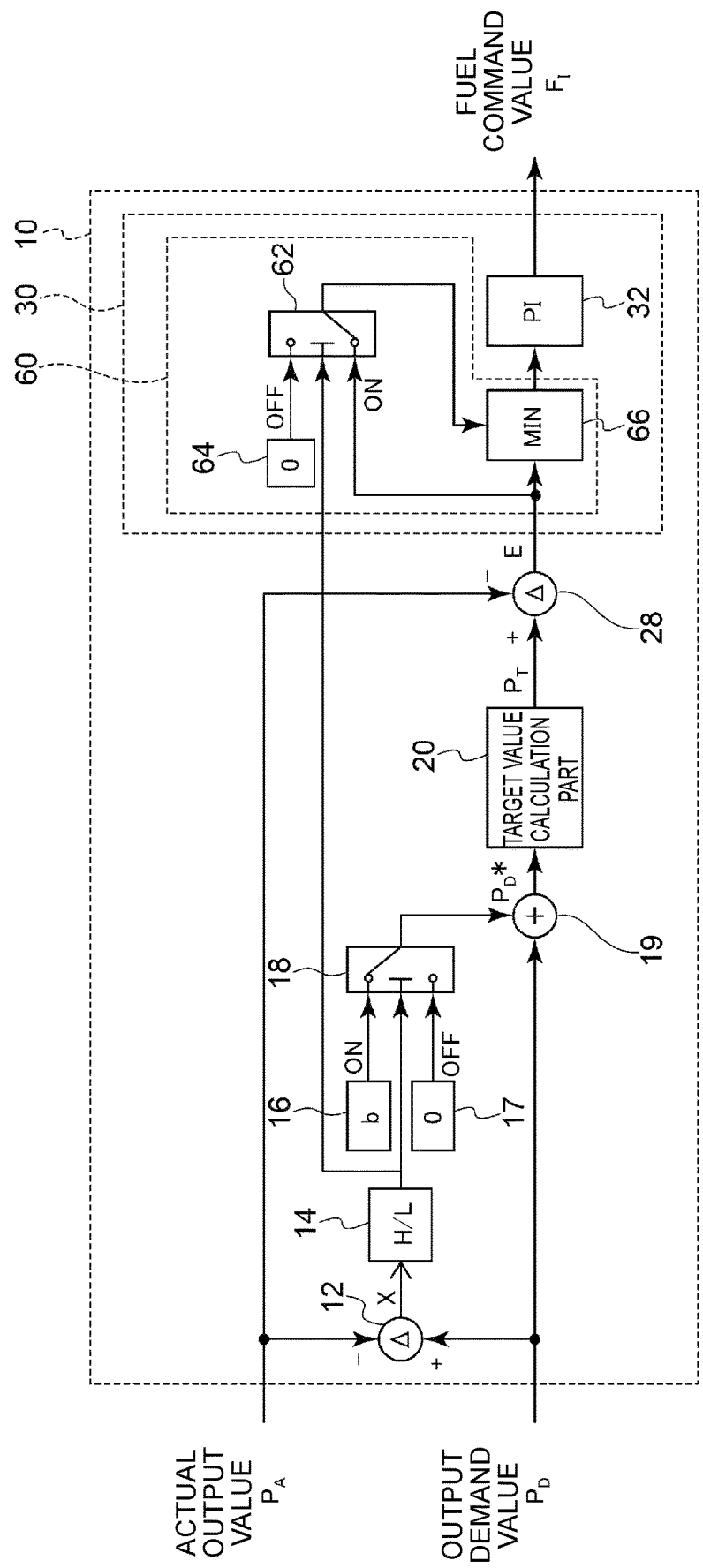
FIG. 11 is a block diagram showing the configuration of a control device according to an embodiment.

In an illustrative embodiment depicted in FIG. 11, the command value calculation part 30 includes a feedback controller 32 and a deviation upper-limit setting part 60.

The feedback controller 32 is configured to receive an input signal based on the deviation E from the subtractor 28, and output a feedback command value FB for calculating the fuel command value $F_I$. The feedback controller 32 may be a PI controller or a PID controller, for instance.

Further, the deviation upper-limit setting part 60 is configured to limit the input signal of the feedback controller 32 to zero if the difference X between the output demand value $P_D$ and the actual output value $P_A$ becomes not greater than the threshold Xth.

That is, the deviation upper-limit setting part 60 includes a switch 62 and a low-value selector 66.

If the above difference X is greater than the threshold Xth, both of the input from the subtractor 29 to the low-value selector 66 and the input from the switch 62 to the low-value selector 66 are the deviation E between the control target value $P_T$ and the actual output value $P_A$. Thus, the deviation E is input into the feedback controller 32 from the low-value selector 66, the feedback command value FB is calculated on the basis of the deviation E, and the feedback command value FB is outputted as the fuel command value $F_I$.

On the other hand, if the above difference X is not greater than the threshold Xth, the above deviation E is input into the low-value selector 66 from the subtractor 29, and the zero value stored in the memory 64 is inputted into the low-value selector 66 from the switch 62. Further, from the low-value selector 66, the zero value, the smaller of the inputs (deviation E and zero value) is outputted to the feedback controller. In other words, the input signal of the feedback controller is limited to zero.

In this case, the deviation used in calculation of the feedback command value FB by the feedback controller 32 is zero, and thus the fuel command value $F_I$ changes to a value not greater than the feedback command value F2 at the time when the difference X reaches the threshold (that is, when the actual output value $P_A$ reaches the output demand value $P_D$; see time t2 in FIG. 8). The temporal change of the fuel command value $F_I$ is as shown in the graph in FIG. 8.

As described above, by limiting the input signal of the feedback controller 32 to zero when the difference X between the output demand value $P_D$ and the actual output value $P_A$ becomes not greater than the threshold Xth, it is possible to suppress excess of the turbine inlet temperature more reliably.

Figure 12:
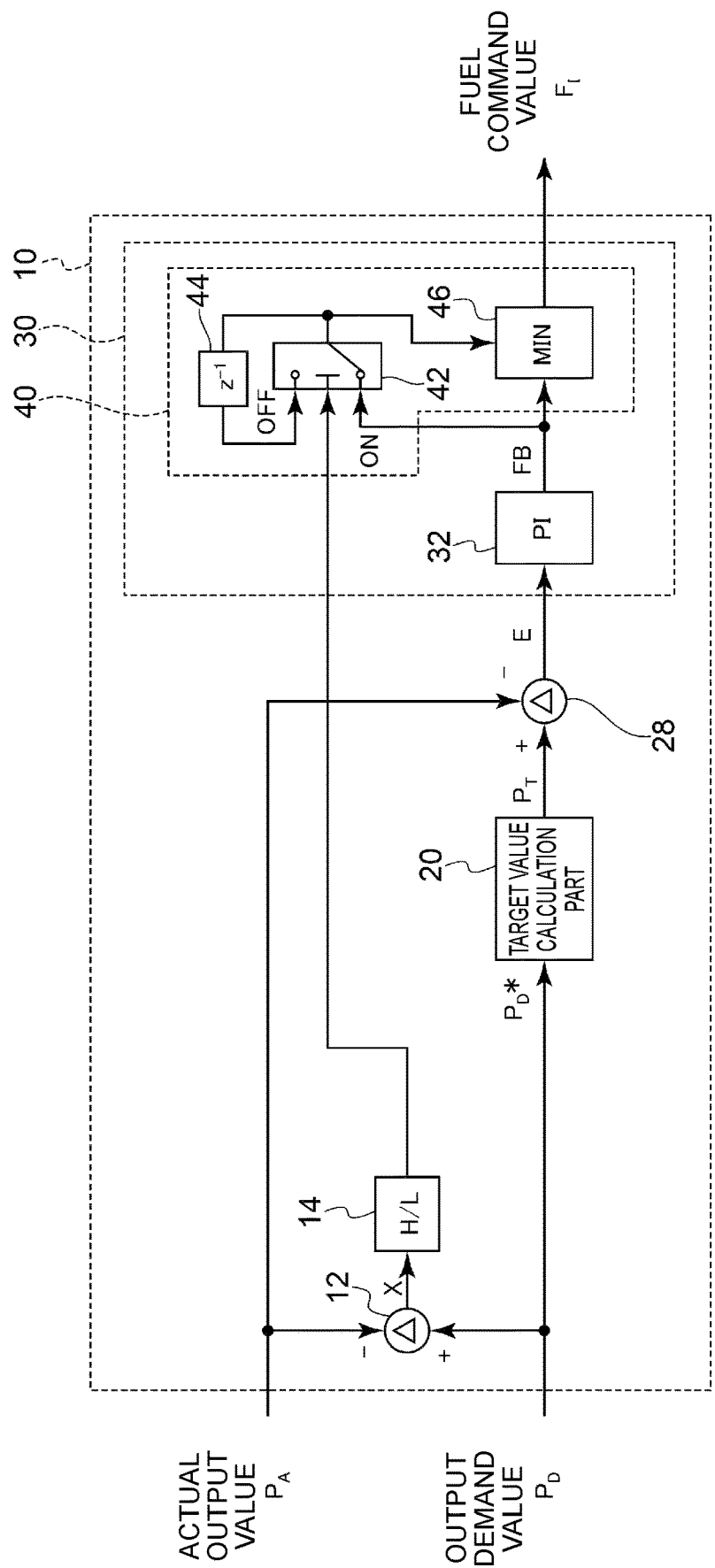
FIG. 12 is a block diagram showing the configuration of a control device according to an embodiment.

FIG. 12 is a configuration block diagram showing the configuration of a control device 10 according to an embodiment.

According to an embodiment, the control device 10 of the gas turbine 1 includes a target value calculation part 20 for calculating a control target value $P_T$ being a target value of the output of the gas turbine 1, and a command value calculation part 30 for calculating the fuel command value $F_I$ on the basis of the deviation E between the control target value $P_T$ and the actual output value $P_A$ of the gas turbine 1.

The command value calculation part 30 includes a feedback controller 32 configured to receive an input signal based on the deviation E and output a feedback command value FB for calculating the fuel command value $F_I$, and a first upper-limit setting part 40 for limiting the fuel command value $F_I$ to be not greater than an upper limit command value being the feedback command value FB at the time when the difference X between the output demand value $P_D$ and the actual output value $P_A$ reaches the threshold Xth, when the difference X becomes not greater than the threshold Xth.

As depicted in FIG. 12, the control device 10 according to an embodiment includes a target value calculation part 20 for calculating a control target value $P_T$ being a target value of the output of the gas turbine 1, and a command value calculation part 30 for calculating the fuel command value $F_I$ related to the flow rate of fuel to be supplied to the combustor 4 of the gas turbine 1.

The target value calculation part 20 is configured to calculate the control target value $P_T$ on the basis of the output demand value $P_D$ of the gas turbine 1 and the actual output value $P_A$ of the gas turbine 1.

The command value calculation part 30 is configured to calculate the fuel command value $F_I$ on the basis of the deviation between the control target value $P_T$ calculated by the target value calculation part 20 and the actual output value $P_A$ of the gas turbine 1.

The output demand value $P_D$ may be given to the control device 10 from outside (e.g. a superior control device).

As depicted in FIG. 12, to the target value calculation part 20 (see FIG. 3), the output demand value $P_D$ is input as a correction demand value $P_D^*$. As described above with reference to FIG. 3, the target value calculation part 20 calculates the control target value $P_T$ to be not greater than the output demand value $P_D$ (correction demand value IV), and outputs the calculated control target value to the subtractor 28.

The command value calculation part 30 includes the above feedback controller 32 and the first upper-limit setting part 40, and has a configuration similar to that described with reference to FIG. 7.

According to the above embodiments, when the difference X between the output demand value $P_D$ and the actual output value $P_A$ is not greater than the threshold Xth, the fuel command value $F_I$ is limited to be not greater than the upper limit command value, which is the feedback command value FB at the time the difference X reaches the threshold Xth. Thus, it is possible to suppress excess of the turbine inlet temperature reliably.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

REFERENCE SIGNS LIST

1 Gas turbine
3 Compressor
4 Combustor
5 Turbine
6 Rotational shaft
7 Flow-rate regulation valve
8 Generator
10 Control device
12 Subtractor
14 Comparator
16 Memory
17 Memory
18 Switch
19 Adder
20 Target value calculation part
21 Subtractor
22 Comparator
24 Comparator
26 Analog memory
28 Subtractor
29 Subtractor
30 Command value calculation part
32 Feedback controller
34 Low-value selector
40 First upper-limit setting part
44 Switch
44 Memory
46 Low-value selector
50 Second upper-limit setting part
52 Switch
54 Memory
60 Deviation upper-limit setting part
62 Switch
64 Memory
66 Low-value selector
104 Combustor
105 Turbine

The invention claimed is:

1. A control device for a gas turbine comprising:
a target value calculation part configured to calculate a control target value being a target value of an output of the gas turbine; and
a command value calculation part configured to calculate a fuel command value on the basis of a deviation between the control target value and an actual output value of the gas turbine,
wherein the target value calculation part is configured to:
immediately before a difference between the output demand value and the actual output value becomes not greater than a threshold, set the control target value to a value which is greater than an output demand value of the gas turbine; and
decrease the control target value from the value after the difference becomes not greater than the threshold,
wherein the control device is configured to control an output of a turbine of the gas turbine.

2. The control device for the gas turbine according to claim 1,
wherein the target value calculation part is configured to:
if a bias adding condition including that the difference is greater than the threshold is satisfied, calculate the control target value to be not greater than an upper limit which is a sum of the output demand value and a bias value; and
calculate the control target value to be a value smaller than the sum of the output demand value and the bias value.

3. The control device for the gas turbine according to claim 2, wherein the target value calculation part is configured to:
if the bias adding condition is satisfied, increase the control target value toward the sum at a constant rate; and
if the bias adding condition is not satisfied, decrease the control target value at a constant rate until the control target value reaches the output demand value.

4. The control device for the gas turbine according to claim 2,
wherein the bias adding condition includes:
a first condition that the difference is greater than the threshold; and
at least one of:
a second condition that an index of a turbine inlet temperature of the gas turbine is less than a threshold of the index;
a third condition that an opening degree of an inlet guide vane of a compressor of the gas turbine is less than a full opening degree; or
a fourth condition that an opening degree of a flow-rate regulating valve for regulating a fuel flow rate of the gas turbine is less than an upper limit value.

5. The control device for the gas turbine according to claim 2,
wherein the bias value is a constant value while the bias adding condition is satisfied.

6. The control device for the gas turbine according to claim 2,
wherein, during a period in which the bias adding condition is satisfied, the bias value is zero when the control target value is smaller than the output demand value, and the bias value is a positive value when the control target value is not smaller than the output demand value.

7. The control device for the gas turbine according to claim 2,
wherein the bias value is set to increase gradually with time while the bias adding condition is satisfied.

8. The control device for the gas turbine according to claim 1,
wherein the command value calculation part includes:
a feedback controller configured to receive an input signal based on the deviation and calculate a feedback command value for calculating the fuel command value; and
a first upper-limit setting part configured to, if the difference becomes not greater than the threshold, limit the fuel command value to be not greater than an upper limit command value being the feedback command value at the time when the difference reaches the threshold.

9. The control device for the gas turbine according to claim 8,
wherein the feedback controller is configured to:
calculate the feedback command value on the basis of a proportional term and an integral term obtained from the deviation; and
if the difference becomes not greater than the threshold, limit an increase of the integral term and calculate the feedback command value.

10. The control device for the gas turbine according to claim 1,
wherein the command value calculation part includes:
a feedback controller configured to receive an input signal based on the deviation and output a feedback command value for calculating the fuel command value;
a low-value selector configured to output a minimum command value between the feedback command value and at least one another command value calculated separately from the feedback command value; and
a second upper-limit setting part configured to, if the difference becomes not greater than the threshold, limit the fuel command value to be not greater than an upper limit command value being an output value of the low-value selector at the time when the difference reaches the threshold.

11. The control device for the gas turbine according to claim 1,
wherein the command value calculation part includes:
a feedback controller configured to receive an input signal based on the deviation and output a feedback command value for calculating the fuel command value; and
a deviation upper-limit setting part configured to, if the difference becomes not greater than the threshold, limit the input signal of the feedback controller to zero.

12. The gas turbine, comprising:
the control device according to claim 1;
a compressor for compressing air;
a combustor for producing combustion gas from combustion reaction of a fuel and compressed air from the compressor; and
the turbine to be driven by the combustion gas from the combustor.

13. A method for controlling a gas turbine, comprising:
a step of calculating a control target value being a target value of an output of the gas turbine; and
a step of calculating a fuel command value on the basis of a deviation between the control target value and an actual output value of the gas turbine,
wherein the step of calculating the control target value includes:
immediately before a difference between the output demand value and the actual output value becomes not greater than a threshold, setting the control target value to a value which is greater than an output demand value of the gas turbine; and
decreasing the control target value from the value after the difference becomes not greater than the threshold.

14. The method for controlling the gas turbine according to claim 13,
wherein the step of calculating the control target value includes:
if a bias adding condition including that the difference is greater than the threshold is satisfied, calculating the control target value to be not greater than an upper limit which is a sum of the output demand value and a bias value; and
calculating the control target value to be a value smaller than the sum of the output demand value and the bias value if the bias adding condition is not satisfied.

15. The method for controlling the gas turbine according to claim 14,
wherein the step of calculating the control target value includes:

if the bias adding condition is satisfied, increasing the control target value toward the sum at a constant rate; and if the bias adding condition is not satisfied, decreasing the control target value at a constant rate until the control target value reaches the output demand value.

16. The method for controlling the gas turbine according to claim 14, wherein the bias adding condition includes:
a first condition that the difference is greater than the threshold; and
at least one of:
a second condition that an index of a turbine inlet temperature of the gas turbine is less than a threshold of the index;
a third condition that an opening degree of an inlet guide vane of a compressor of the gas turbine is less than a full opening degree; or
a fourth condition that an opening degree of a flow-rate regulating valve for regulating a fuel flow rate of the gas turbine is less than an upper limit value.

17. The method for controlling the gas turbine according to claim 14, wherein the step of calculating the fuel command value includes:
a step of calculating a feedback command value for calculating the fuel command value on the basis of an input value based on the deviation; and
a step of, if the difference becomes not greater than the threshold, limiting the fuel command value to be not greater than an upper limit command value being the feedback command value at the time when the difference reaches the threshold.

18. The method for controlling the gas turbine according to claim 17, wherein the step of calculating the feedback command value includes:
calculating the feedback command value on the basis of a proportional term and an integral term obtained from the deviation; and
if the difference becomes not greater than the threshold, limiting an increase of the integral term and calculating the feedback command value.

19. The method for controlling the gas turbine according to claim 13, wherein the step of calculating the fuel command value includes:
a step of calculating a feedback command value for calculating the fuel command value on the basis of an input value based on the deviation;
a step of calculating a minimum command value between the feedback command value and at least one another command value calculated separately from the feedback command value; and
a step of, if the difference becomes not greater than the threshold, limiting the fuel command value to be not greater than an upper limit command value being the minimum command value at the time when the difference reaches the threshold.

20. The method for controlling the gas turbine according to claim 13, wherein the step of calculating the fuel command value includes:
a step of calculating a feedback command value for calculating the fuel command value on the basis of an input value based on the deviation; and
a step of, if the difference becomes not greater than the threshold, limiting the input signal in the step of calculating the feedback command value to zero.

* * * * *